(12) United States Patent
Ihm et al.

(10) Patent No.: US 8,116,392 B2
(45) Date of Patent: Feb. 14, 2012

(54) METHOD FOR TRANSMITTING/RECEIVING SIGNAL HAVING SPREAD TRAINING SYMBOL IN MOBILE COMMUNICATION SYSTEM

(75) Inventors: Bin Chul Ihm, Gyeonggi-do (KR); Moon Il Lee, Gyeonggi-do (KR); Jin Young Chun, Seoul (KR); Wook Bong Lee, Gyeonggi-do (KR); Jae Won Chang, Gyeonggi-do (KR); Jin Hyuk Jung, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 706 days.

(21) Appl. No.: 11/995,674

(22) PCT Filed: Jul. 12, 2006

(86) PCT No.: PCT/KR2006/002741
§ 371 (c)(1),
(2), (4) Date: Jul. 22, 2008

(87) PCT Pub. No.: WO2007/008036
PCT Pub. Date: Jan. 18, 2007

(65) Prior Publication Data
US 2009/0220021 A1    Sep. 3, 2009

(30) Foreign Application Priority Data

| Jul. 13, 2005 | (KR) | 10-2005-0063228 |
| Nov. 10, 2005 | (KR) | 10-2005-0107272 |
| Dec. 26, 2005 | (KR) | 10-2005-0129646 |
| Mar. 30, 2006 | (KR) | 10-2006-0029045 |

(51) Int. Cl.
*H04K 1/10* (2006.01)

(52) U.S. Cl. .................................. 375/260

(58) Field of Classification Search .................. 375/260, 375/267, 285, 295, 299, 316, 340, 346, 349; 370/208, 334, 335, 342, 491
See application file for complete search history.

(56) References Cited

U.S. PATENT DOCUMENTS 6,842,442 B2 * 1/2005 Okawa et al. .................. 370/335
(Continued)

FOREIGN PATENT DOCUMENTS

EP    1501251    1/2005
(Continued)

OTHER PUBLICATIONS

Budianu, C., et al., "Channel Estimation for Space-Time Orthogonal Block Codes," IEEE Transactions on Signal Processing, vol. 50, No. 10, pp. 2515-2528, Oct. 2002.
Giannakis, G.B.; "Highlights of Signal Processing for Communications", Mar. 1999, IEEE Signal Processing Magazine.
(Continued)

*Primary Examiner* — Khanh C Tran
(74) *Attorney, Agent, or Firm* — Lee, Hong, Degerman, Kang & Waimey

(57) ABSTRACT

A method for transmitting/receiving signals in a mobile communication system, a pilot configuration of a mobile communication system capable of transmitting much more data using a conventional pilot signal, a channel estimation method, and a receiving method are disclosed. A method for transmitting a signal equipped with a training symbol in a mobile communication system which includes a transmission end capable of transmitting an output signal equipped with a training symbol for channel estimation of a reception end, includes the steps of: a) adding training symbols having the same amplitude to data symbols transmitted via subcarriers, and calculating the output signal transmitted via the subcarriers; and b) transmitting the calculated output signal via the subcarriers.

14 Claims, 23 Drawing Sheets

U.S. PATENT DOCUMENTS

| | | | |
|---|---|---|---|
| 7,095,709 B2 * | 8/2006 | Walton et al. ............... 370/208 |
| 7,218,617 B1 * | 5/2007 | Usuda et al. ................ 370/320 |
| 2003/0235147 A1 | 12/2003 | Walton et al. | |
| 2004/0228267 A1 * | 11/2004 | Agrawal et al. ............ 370/203 |
| 2005/0008089 A1 | 1/2005 | Bothe et al. | |

FOREIGN PATENT DOCUMENTS

| | | |
|---|---|---|
| JP | 7221700 | 8/1995 |
| JP | 2002522988 | 7/2002 |

OTHER PUBLICATIONS

Budian, C. et al.; "Channel estimation for space-time orthogonal block codes." Jun. 11-14, 2001; IEEE International Conference on Communications.

Garcia, L. et al: "Iterative channel estimation for turbo receivers in DS-CDMA." May 17-21, 2004, IEEE International Conference on Acoustics, Speech, and Signal Processing.

* cited by examiner conventional transmission format

P: pilot or preamble conventional transmission format

Proposed transmission format

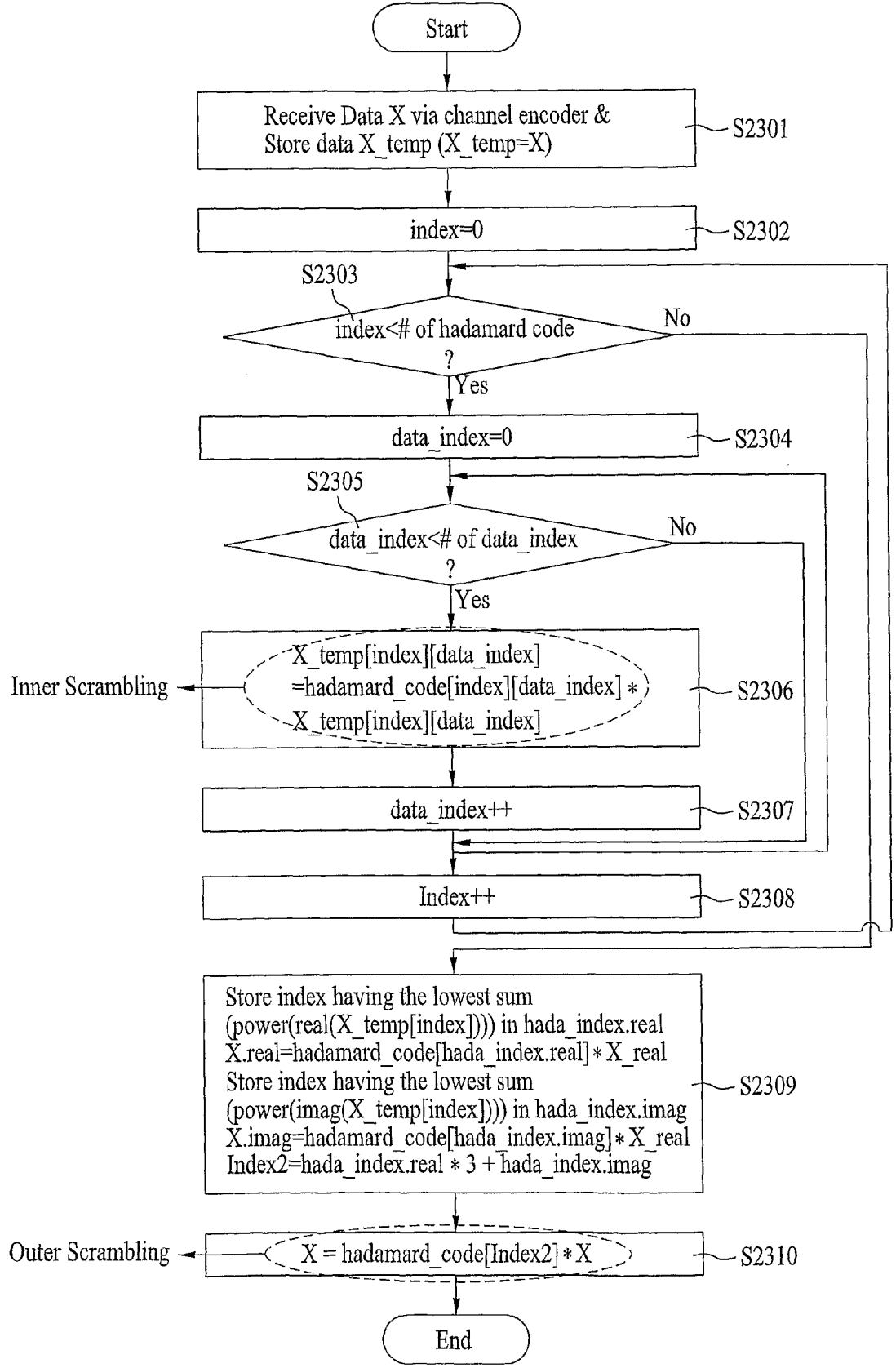

METHOD FOR TRANSMITTING/RECEIVING SIGNAL HAVING SPREAD TRAINING SYMBOL IN MOBILE COMMUNICATION SYSTEM

CROSS-REFERENCE TO RELATED APPLICATIONS

This application is a 371 U.S. national stage application of International Application No. PCT/KR2006/002741, filed on Jul. 12, 2006, which claims priority to Korean Application Nos. 10-2005-0063228, filed on Jul. 13, 2005, 10-2005-0107272, filed on Nov. 10, 2005, 10-2005-0129646, filed on Dec. 26, 2005, and 10-2006-0029045, filed on Mar. 30, 2006.

TECHNICAL FIELD

The present invention relates to a method for transmitting/receiving signals in a wireless (or radio) mobile communication system, and more particularly to a pilot configuration of a wireless mobile communication system for efficient use of radio resources in the wireless mobile communication system, and a channel estimation and reception method based on the same.

BACKGROUND ART

A conventional channel estimation technology will hereinafter be described in detail.

A process of estimating and compensating for a signal distortion which may occur due to multipath fading, etc. is called "channel estimation". This channel estimation is roughly classified into a pilot signal-based scheme and a data-based scheme according to the format of data used for the channel estimation. The pilot signal-based scheme is adapted to allocate a part of a time or frequency domain to a specific signal for the channel estimation.

FIG. 1 illustrates a conventional method for configuring a pilot signal in a communication system (for example, an OFDM/OFDMA, FDM/FDMA, TDM/TDMA or CDM/CDMA communication system).

In a conventional wireless communication system, data is allocated to a specific subcarrier, specific frequency band, specific time slot or specific code. A pilot is also allocated to a frequency-time resource other than the allocated subcarrier, frequency band, time slot or code.

The pilot means a pilot signal. As mentioned above, the OFDM/OFDMA, FDM/FDMA, TDM/TDMA and CDM/CDMA communication systems multiplex the data and pilots using the subcarriers, frequency bands, time slots and codes, respectively.

The data or pilot multiplexed using the subcarrier, frequency band, time slot or code is referred to as a "sample." For example, the sample in the OFDM/OFDMA system represents a data signal or pilot signal transmitted at a specific subcarrier, the sample in the FDM/FDMA system represents a data signal or pilot signal transmitted at a specific frequency band, the sample in the TDM/TDMA system represents a data signal or pilot signal transmitted for a specific time slot, and the sample in the CDM/CDMA system represents a data signal or pilot signal transmitted through a specific code. These respective samples are transmitted through specific frequency-time resources (for example, a specific subcarrier, specific frequency band, specific time slot and specific code).

An index "m" will hereinafter be used for distinction of the frequency-time resources based on indexes. For example, the index "m" for a specific sample in the OFDM/OFDMA system is a data symbol index for distinction of a subcarrier on which the specific sample is transmitted.

Also, the index "m" for a specific sample in the FDM/FDMA system is a frequency index for distinction of a frequency band at which the specific sample is transmitted.

Also, the index "m" for a specific sample in the TDM/TDMA system is a time index for distinction of a time slot for which the specific sample is transmitted.

Also, the index "m" for a specific sample in the CDM/CDMA system is a code index for distinction of a code applied to the specific sample.

A description will hereinafter be given of a process of performing channel estimation using a pilot signal and decoding data according to the channel estimation.

At a receiving stage, data transmitted from a transmitting stage can be accurately restored by, through the following procedures, estimating a channel using a pilot and compensating for the value of the estimated channel.

Assuming that a transmitted signal is "d", a channel is "h", an additive white Gaussian noise (AWGN) is "v", and a received signal is "x", the received signal "x" can be expressed as in an equation x=h·d+v, and, at the receiving side, a channel $\hat{h}$ can be estimated through this equation because a pilot value is known in advance.

$$x_m/\hat{h} = h \cdot d/\hat{h} + v/\hat{h} \approx d + \bar{v} \qquad [\text{Equation 1}a]$$

Substituting the value of the estimated channel into the above equation 1a, the data d can be finally restored.

In the aforementioned channel estimation method, accuracy of the channel estimation value $\hat{h}$ using the pilot is important. The channel of the pilot is not accurately equal to that of the data.

However, the closer the pilot-based channel estimation value is to a time or frequency axis, the higher the similarity between the pilot channel environment and the data channel environment, such that the above-mentioned pilot-based channel estimation information is used for the data recovery.

In other words, the closer the pilot is to the data, the higher the channel estimation throughput (or performance). The higher the number of pilots, the higher the channel estimation throughput, such that the data recovery is implemented. However, the allocation of a large number of pilots means that a large amount of resources to be allocated to the data are consumed, such that it is very important to properly arrange the above-mentioned pilots.

The OFDMA technology will hereinafter be described in detail.

Firstly, an OFDM (Orthogonal Frequency Division Multiplexing) technology will be described for the convenience of description. The OFDM technology converts input data into parallel data units equal to the number of used subcarriers, loads the parallel data units in each subcarrier, and transmits the subcarriers including the parallel data units, such that it is considered to be a MultiCarrier Transmission/Modulation (MCM) scheme employing a variety of subcarriers.

Secondly, the OFDMA (Orthogonal Frequency Division Multiple Access) technology will be described in detail. The OFDMA scheme allocates a different number of subcarriers according to a transfer rate requested by each user, such that it can effectively distribute resources. Similar to the OFDMA-TDMA scheme, the OFDMA scheme need not execute the initialization using a preamble before each user receives data, resulting in increased transmission efficiency.

Specifically, the OFDMA scheme is suitable for a specific case where a large number of subcarriers are used, such that it can be effectively used for the wireless communication system equipped with a broad-area cell having a relatively-high Time Delay Spread (TDS).

Also, a frequency-hopping OFDMA scheme solves the problems generated when a subcarrier-interference caused by other users or a deep-fading subcarrier occurs in a radio or wireless channel, such that it increases a frequency-diversity effect and acquires an interference-averaging effect.

FIG. 2 is a conceptual diagram illustrating a pilot allocation scheme for use in an OFDM-based wireless communication system.

The IEEE 802.16 system performs the pilot allocation using the pilot allocation scheme shown in FIG. 2. A pilot allocation scheme for the OFDM-based wireless communication system will hereinafter be described with reference to FIG. 2. The IEEE 802.16 system may have 128 subcarriers, 512 subcarriers, 1024 subcarriers, or 2048 subcarriers. Some parts of both sides of a total of subcarriers are used as a protection band. In the case of the remaining parts other than the above-mentioned parts, a single subcarrier from among 9 subcarriers is allocated to the pilot, and the remaining 8 subcarriers other than the single subcarrier may be allocated to data.

Conventional TDM/TDMA, FDM/FDMA, and CDM/CDMA technologies will hereinafter be described.

FIG. 3 is a conceptual diagram illustrating a conventional pilot allocation scheme for a TDM/TDMA-based wireless communication system.

Referring to FIG. 3, a data signal is assigned to each time slot according to the TDM/TDMA scheme. The data signal is contained in a first timeslot, and the pilot signal is contained in a second timeslot, such that the first and second timeslots including the data and pilot signals are transmitted to a destination.

FIG. 4 is a conceptual diagram illustrating a pilot allocation scheme for a CDM/CDMA-based wireless communication system.

Individual data signals are distinguished from each other by different codes according to the CDM/CDMA scheme. Preferably, in the case of multiplexing individual data units, the above-mentioned different codes may be orthogonal codes to allow a reception end to detect the data units while being classified.

As shown in FIG. 4, each data signal and each pilot signal are distinguished from each other by different codes, such that they are transmitted to a radio channel.

In the case of the pilot allocation based on the FDM/FDMA technology, individual data signals are classified according to a frequency band for transmission of the above-mentioned signals. Preferably, a predetermined protection area may be formed between the above-mentioned frequency bands to reduce interference between several data signals. In the case of the FDM/FDMA technology, the above-mentioned data signal and the pilot signal are distinguished from each other according to different frequency bands, such that they are transmitted to the radio channel.

It is assumed that the wireless communication system based on OFDM/OFDMA, FDM/FDMA, TDM/TDMA, or CDM/CDMA technology uses the aforementioned conventional pilot-signal usage method. Under this situation, the higher the number of the pilot signals, the higher the channel estimation throughput. However, the action of increasing pilot signals within limited frequency/time resources unavoidably encounters the reduction of data transmission resources.

For example, if the OFDM/OFDMA-based wireless communication system allocates a single subcarrier from among 9 subcarriers to the pilot, this means that radio resources for data transmission are reduced by the ratio of 1/9. Provided that a single subcarrier from among 3 subcarriers is allocated to the pilot to perform the channel estimation of a higher throughput, radio resources for data transmission are reduced by the ratio of 1/3.

DISCLOSURE OF INVENTION

Accordingly, the present invention is directed to a method for transmitting/receiving a signal including a spread training symbol in a mobile communication terminal that substantially obviates one or more problems due to limitations and disadvantages of the related art.

An object of the present invention devised to solve the problem lies on a pilot configuration method for effectively employing radio resources, a channel estimation method, and a signal receiving method.

A method for transmitting a signal equipped with a disjointed pilot signal in a mobile communication system can be applied to a mobile communication system based on OFDM/OFDMA, TDM/TDMA, FDM/FDMA, and CDM/CDMA technologies.

According to the present invention, disjointed pilot signals are arranged to subcarriers, timeslots, or codes, such that a large amount of transmission data can be transmitted to limited frequency-time resources.

The object of the present invention can be achieved by providing a method for transmitting a signal equipped with a training symbol in a mobile communication system which includes a transmission end capable of transmitting an output signal equipped with a training symbol for channel estimation of a reception end, the method comprising the steps of: a) adding training symbols having the same amplitude to data symbols transmitted via subcarriers, and calculating the output signal transmitted via the subcarriers; and b) transmitting the calculated output signal via the subcarriers.

In another aspect of the present invention, there is provided a method for transmitting a signal equipped with a training symbol in a mobile communication system which includes a transmission end capable of transmitting an output signal equipped with a training symbol for channel estimation of a reception end, the method comprising the steps of: a) calculating an auxiliary signal added to data symbols transmitted via individual subcarriers so as to allow the sum of the data symbols (i.e., data signals) to be zero; b) adding training symbols having the same amplitude and the calculated auxiliary signal to the data symbols, and calculating the output signal on the basis of the added result; c) transmitting information of the calculated auxiliary signal to the reception end; and d) transmitting the calculated output signal via the subcarriers.

In a further aspect of the present invention, there is provided a method for transmitting a signal equipped with a training symbol in a mobile communication system which includes a transmission end capable of transmitting an output signal equipped with a training symbol for channel estimation of a reception end using orthogonal subcarriers, the method comprising the steps of: a) calculating an auxiliary signal added to each data signal transmitted via a predetermined number of subcarriers so as to allow the sum of the data signals to be zero; b) coding the data signals using the data signals transmitted via predetermined subcarriers (i.e., a predetermined number of subcarriers), and the calculated auxiliary signal, a predetermined value for a coding operation; c) adding training symbols having the same amplitude and the calculated auxiliary signal to the coded data signals, and calculating the output signal on the basis of the added result; d) transmitting information of the calculated auxiliary signal associated with the predetermined subcarriers to the reception end; and e) transmitting the calculated output signal via the subcarriers.

In a further aspect of the present invention, there is provided a method for transmitting a signal equipped with a training symbol in a mobile communication system which includes a transmission end capable of transmitting data via a plurality of transmission antennas, the method comprising the steps of: a) adding training symbols having the same amplitude to data symbols, where the training symbols are added in the form of disjointed data associated with the transmission antennas, and calculating an output signal using the added result; and b) transmitting the calculated output signal via the subcarriers.

In a further aspect of the present invention, there is provided a method for transmitting a signal equipped with a training symbol in a mobile communication system which includes a transmission end capable of transmitting data via a plurality of transmission antennas, the method comprising the steps of: a) adding training symbols having the same amplitude to data symbols, and calculating the sum of the training symbols configured in the form of disjointed data associated with the transmission antennas; b) adding an auxiliary signal to the data symbols including the training symbols, calculating the sum of the same auxiliary signals associated with a specific transmission antenna, and calculating an output signal; and c) transmitting the calculated output signal via the subcarriers, whereby the auxiliary signal is added to the data symbols so as to allow the sum of predetermined data signals (i.e., a predetermined number of data symbols) to be zero.

In a further aspect of the present invention, there is provided a method for transmitting a signal equipped with a training symbol in a mobile communication system which includes a reception end capable of performing channel estimation using training symbols transmitted via orthogonal subcarriers, and recovering a data signal using the channel-estimated value, the method comprising the steps of: a) performing channel estimation of predetermined subcarriers (i.e., a predetermined number of subcarriers) using reception signals transmitted via individual subcarriers and predetermined-sized training symbols; and b) recovering the data signal using the reception signals, the predetermined-sized training symbols, and the channel-estimated value.

In a further aspect of the present invention, there is provided a method for transmitting a signal equipped with a training symbol in a mobile communication system which includes a reception end capable of performing channel estimation using training symbols transmitted via orthogonal subcarriers, and recovering a data signal using the channel-estimated value, the method comprising the steps of: a) performing channel estimation of predetermined subcarriers (i.e., a predetermined number of subcarriers) using reception signals transmitted via individual subcarriers and predetermined-sized training symbols; b) receiving information of an auxiliary signal added to each data signal transmitted via the predetermined subcarriers so as to allow the sum of the predetermined data signals to be zero; and c) recovering the data signals using the received signal, the predetermined-sized training symbols, the channel-estimated value, and the auxiliary signal.

In a further aspect of the present invention, there is provided a method for transmitting a signal equipped with a training symbol in a mobile communication system which includes a reception end capable of performing channel estimation using training symbols transmitted via orthogonal subcarriers, and recovering a data signal using the channel-estimated value, the method comprising the steps of: a) receiving an auxiliary signal, which is added to data signals assigned to predetermined subcarriers (i.e., a predetermined number of subcarriers) to allow the sum of the predetermined data signals to be zero, and reception signals for transmitting individual data signals coded by a predetermined coding value via the subcarriers; b) performing channel estimation on the predetermined subcarriers using the reception signals contained in the subcarriers and predetermined-sized training symbols; and c) recovering the data signals using the received signal, the predetermined-sized training symbols, the channel-estimated value, and the predetermined coding value.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 23 is a flow chart illustrating a method for executing a specific coding composed of two stages according to the present invention.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Preferred Embodiments

In order to solve the problems of the above-mentioned conventional art, a variety of channel estimation methods for allocating pilot signals to a small number of subcarriers, and performing the channel estimation using only the small number of pilot signals are proposed. However, the present invention provides a method for loading many more transmission data units to the subcarriers using the conventional pilot signals.

The present invention provides a transmission method for spreading the pilot signals to a data area. In order words, the present invention provides a method for including a pilot signal and a data signal in a specific subcarrier, and transmitting the pilot and data signals using the subcarrier.

Figure 1:
FIG. 1 is a conceptual diagram illustrating a conventional method for configuring a pilot signal in a communication system (e.g., an OFDM/OFDMA, FDM/FDMA, TDM/TDMA, or CDM/CDMA communication system)
Figure 1:
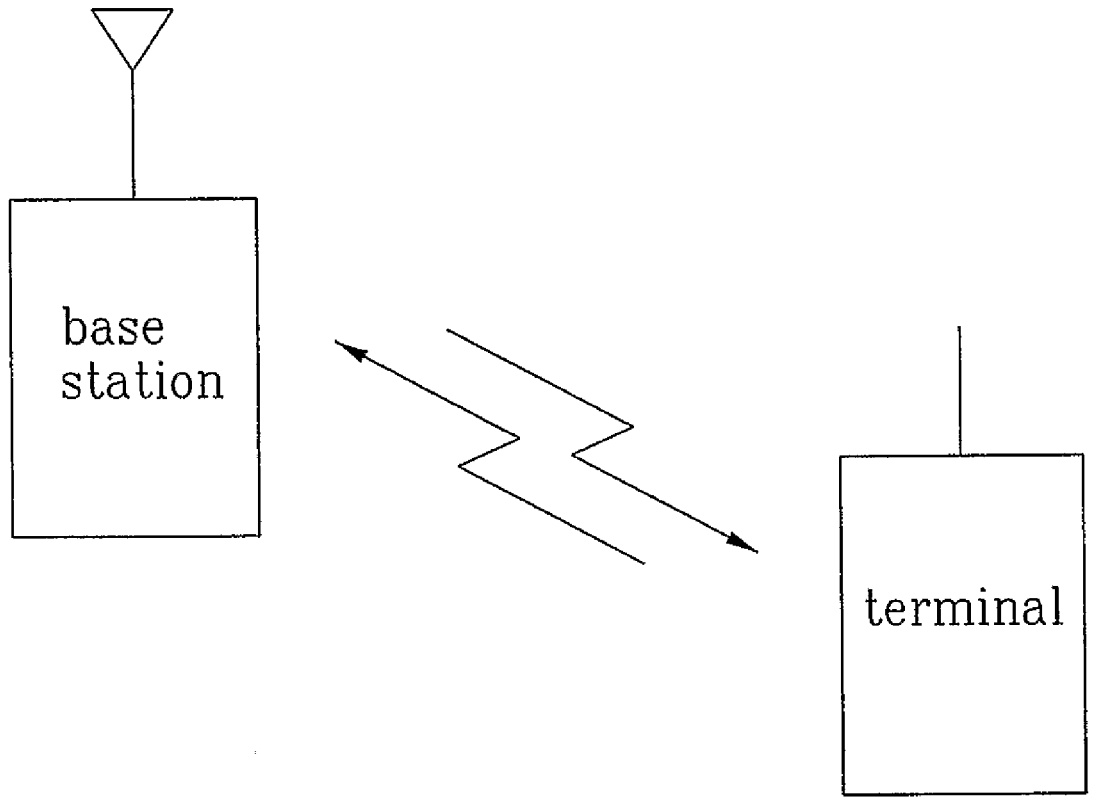
Figure 2:
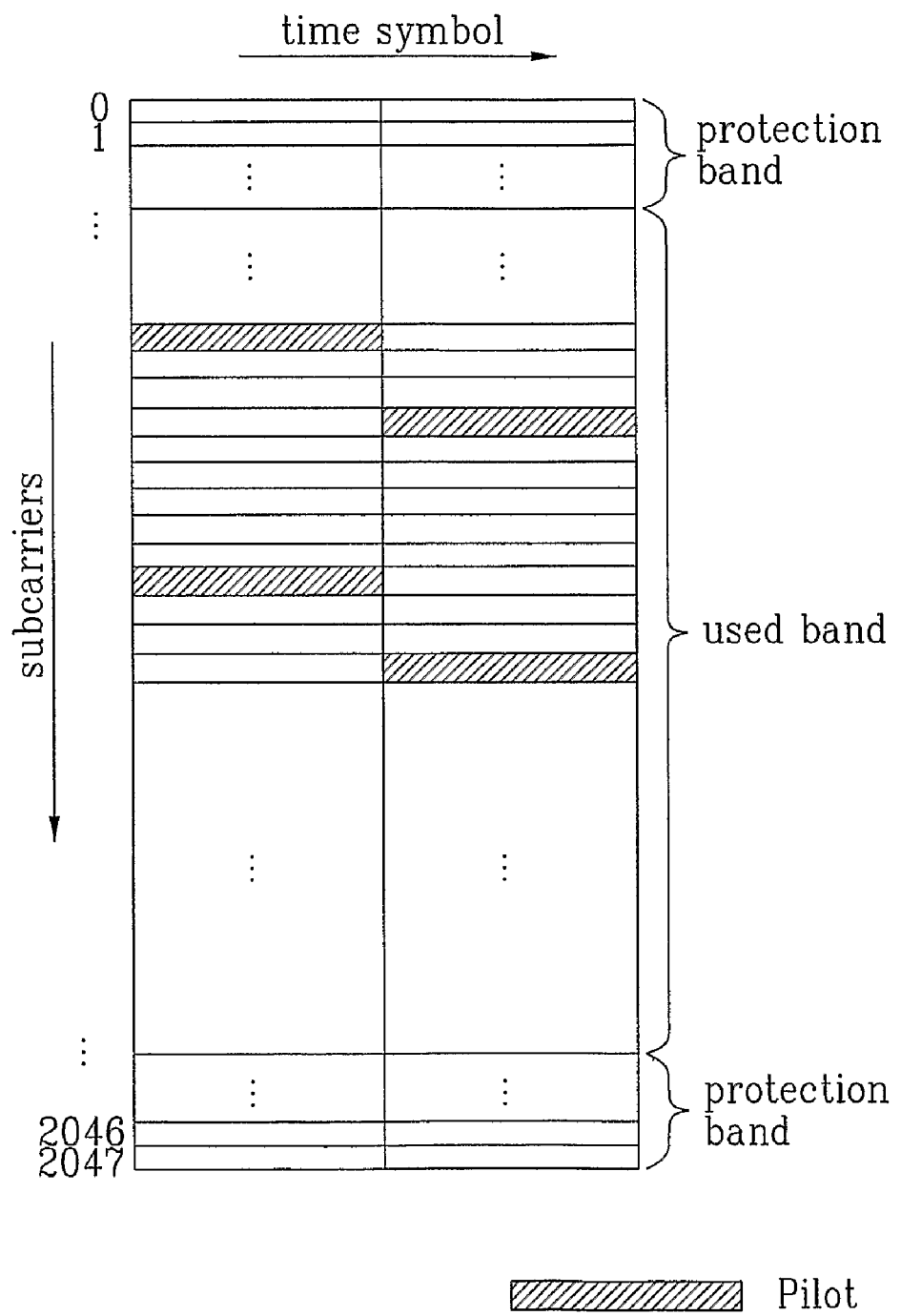
FIG. 2 is a conceptual diagram illustrating a conventional pilot allocation scheme for use in an OFDM-based wireless communication system.
Figure 3:
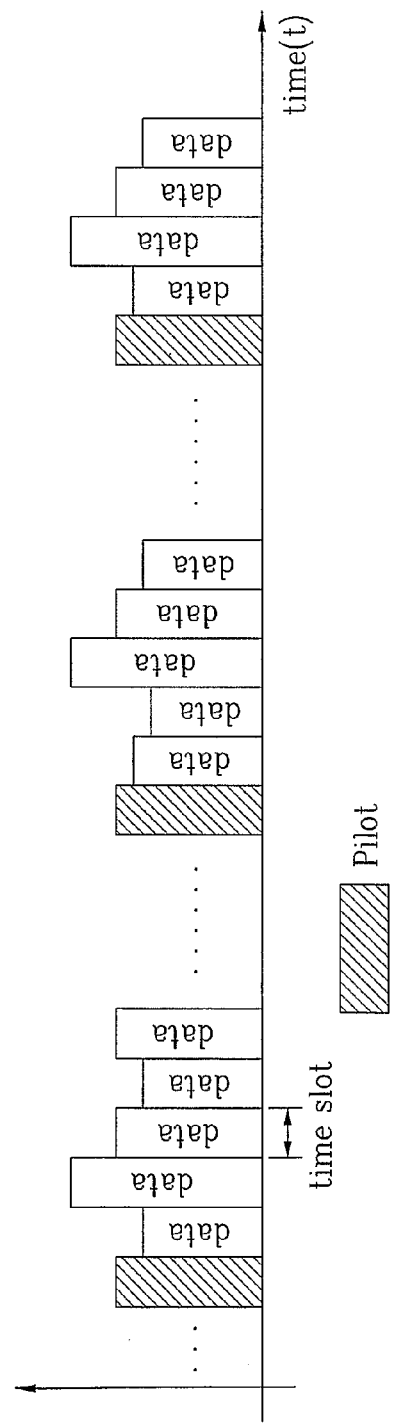
FIG. 3 is a conceptual diagram illustrating a conventional pilot allocation scheme for use in a TDM/TDMA-based wireless communication system.
Figure 4:
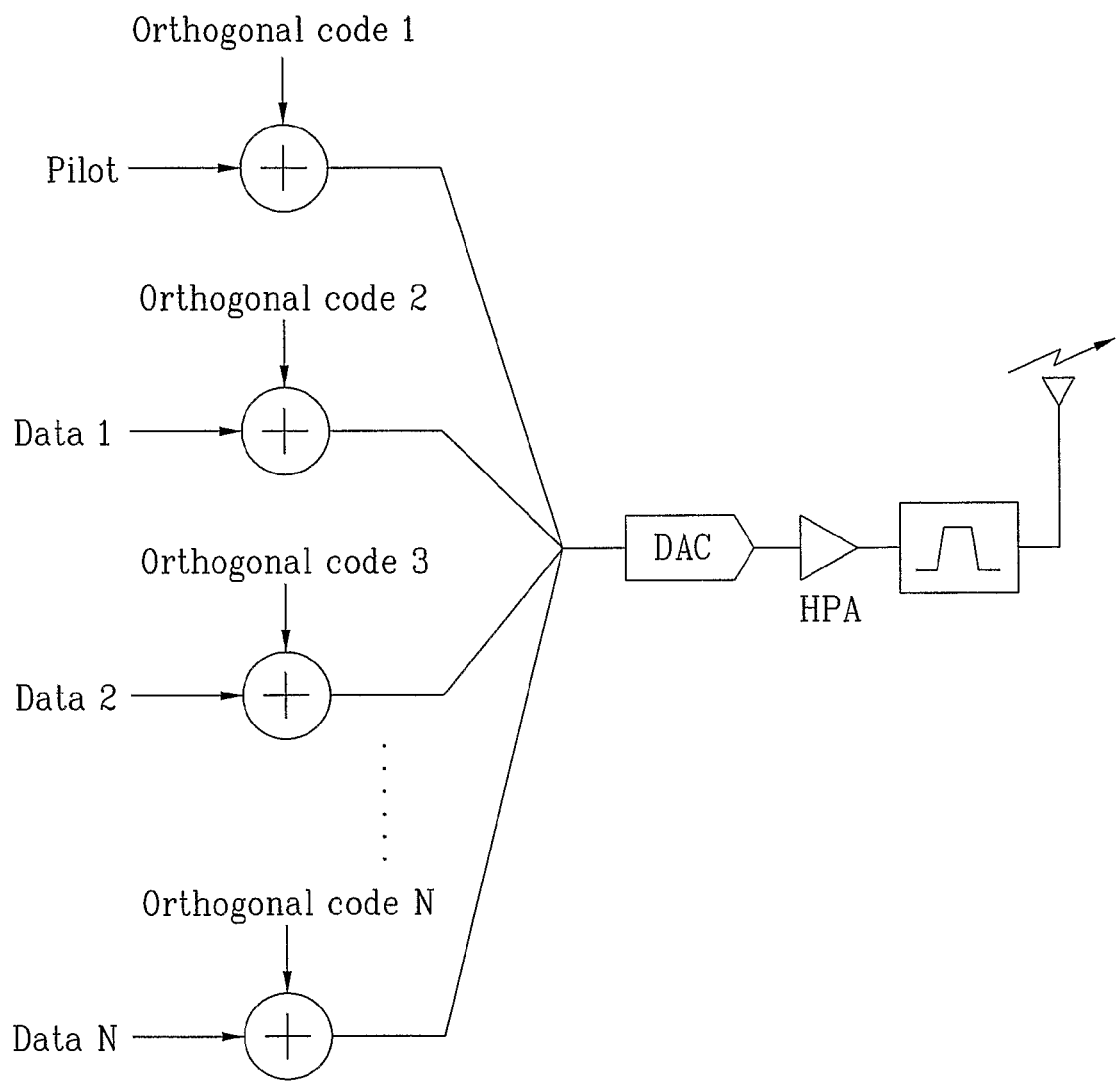
FIG. 4 is a conceptual diagram illustrating a conventional pilot allocation scheme for use in a CDM/CDMA-based wireless communication system.
Figure 5:
FIG. 5 is a conceptual diagram illustrating a method for configuring a pilot signal according to the present invention.
Figure 5:
Figure 5:
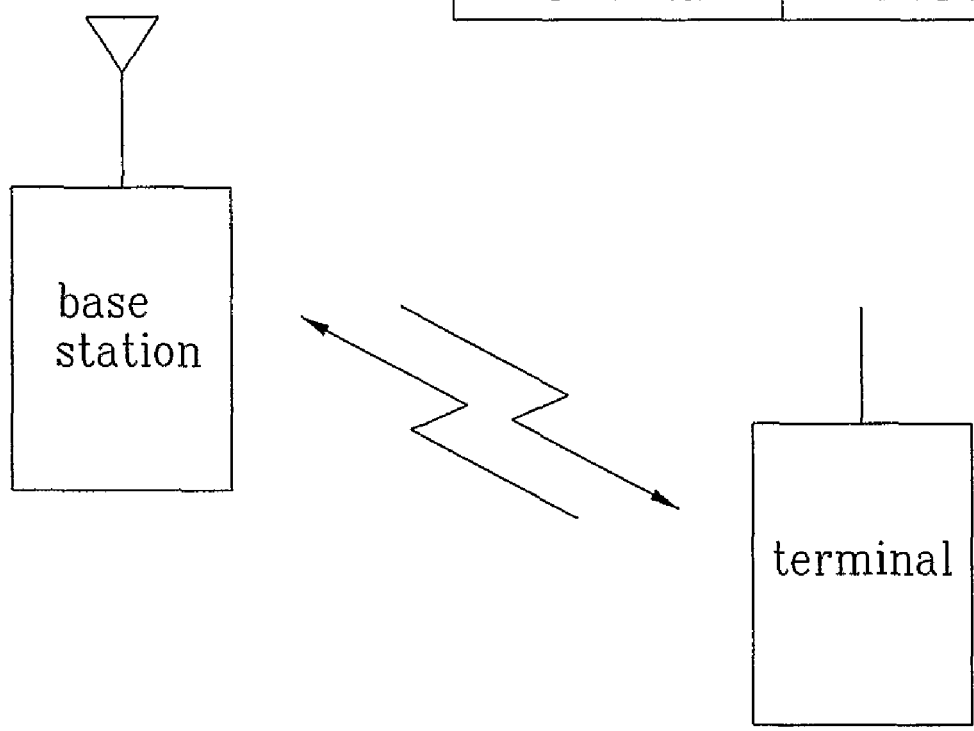

FIG. 5 is a conceptual diagram illustrating a method for configuring a pilot signal according to the present invention.

As previously described above, the conventional art has been designed to include only the pilot signal or the data signal in a single sample. However, the present invention provides a method for transmitting the pilot and data signals in a single sample.

First Preferred Embodiment

A first preferred embodiment of the present invention provides a method for transmitting/receiving a sample equipped with data and pilot signals. It is characterized in that the pilot signals contained in the sample have the same size. Preferably, the size of each pilot signal may be determined according to the pilot-signal size of the conventional art.

The above-mentioned first preferred embodiment will hereinafter be described with reference to FIGS. 6 to 8.

Figure 6:
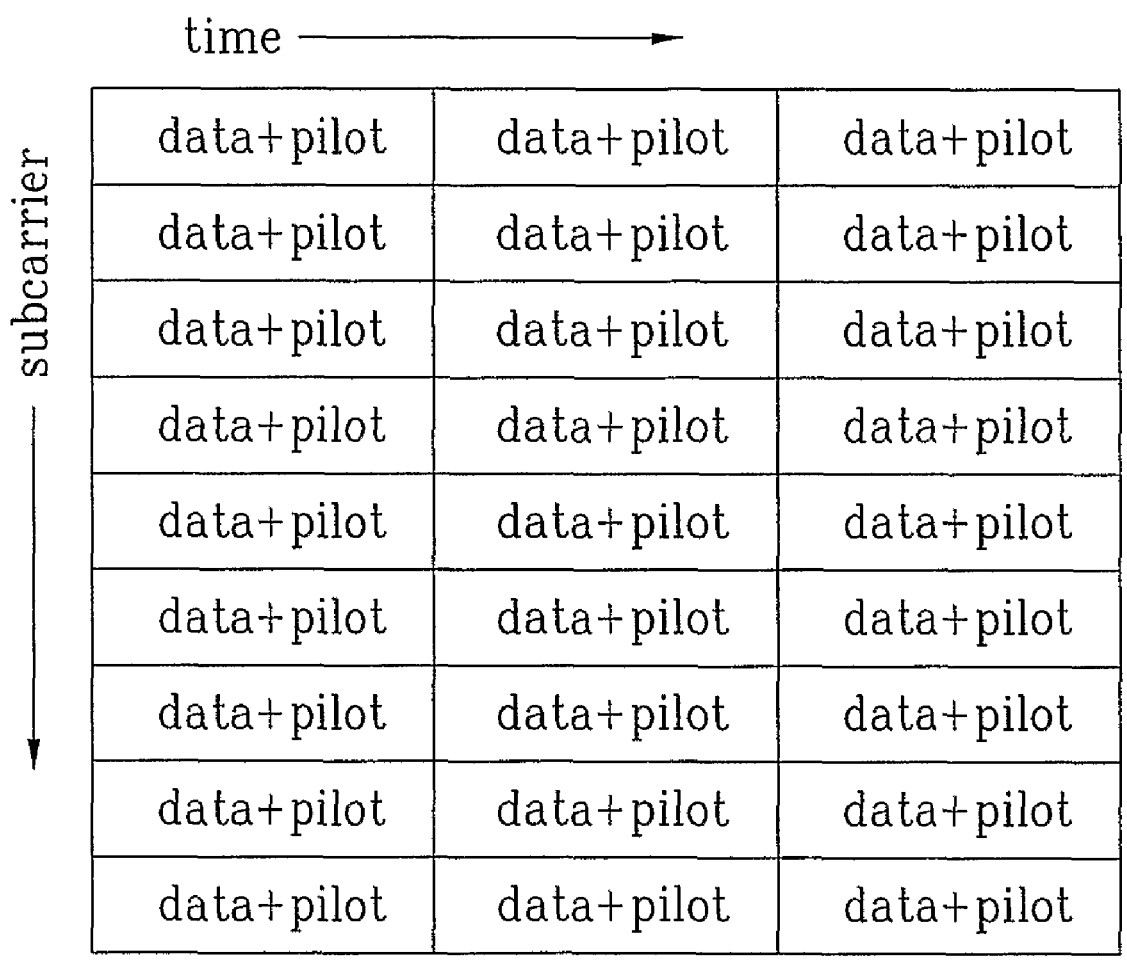
FIG. 6 is a conceptual diagram illustrating a method for configuring a pilot signal implemented in the OFDM/OFDMA system according to a first preferred embodiment of the present invention.

FIG. 6 is a conceptual diagram illustrating a method for configuring a pilot signal implemented in the OFDM/OFDMA system according to a first preferred embodiment of the present invention.

A method for configuring a pilot signal according to the first preferred embodiment of the present invention will hereinafter be described with reference to FIG. 6. As can be seen from FIG. 6, each sample includes data and pilot signals.

Figure 7:
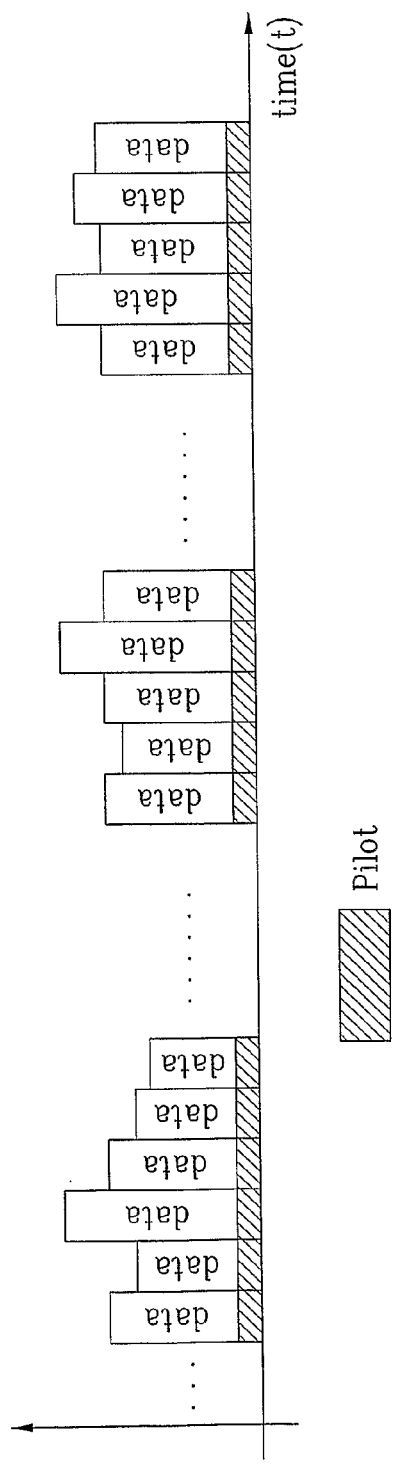
FIG. 7 is a conceptual diagram illustrating a method for configuring a pilot signal implemented in the TDM/TDMA system according to a first preferred embodiment of the present invention.

FIG. 7 is a conceptual diagram illustrating a method for configuring a pilot signal implemented in the TDM/TDMA system according to a first preferred embodiment of the present invention. As can be seen from FIG. 7, each sample includes a predetermined-sized pilot signal (i.e., a signal transmitted to a specific timeslot).

Figure 8:
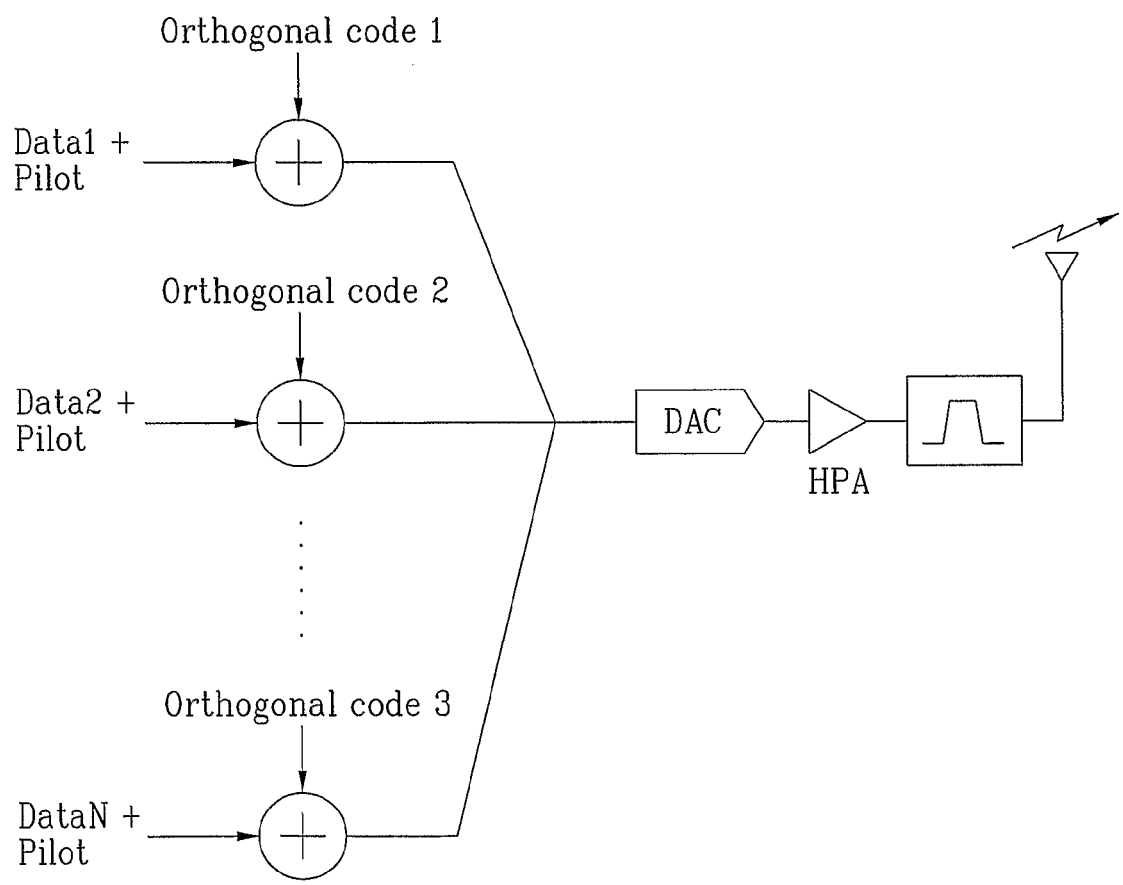
FIG. 8 is a conceptual diagram illustrating a method for configuring a pilot signal implemented in the CDM/CDMA system according to a first preferred embodiment of the present invention.

FIG. 8 is a conceptual diagram illustrating a method for configuring a pilot signal implemented in the CDM/CDMA system according to a first preferred embodiment of the present invention. As can be seen from FIG. 8, each sample includes a predetermined-sized pilot signal (i.e., a signal transmitted by a specific code).

A method for configuring a pilot signal using the FDM/FDMA system is the same as the above-mentioned methods. Each sample includes a predetermined-sized pilot signal (i.e., a signal transmitted by a specific frequency band).

Preferably, the sizes of pilot signals contained in individual samples may be equal to each other. Preferably, the size of each pilot signal may be determined by uniform division of the conventional-art pilot signal size.

The conventional OFDM/OFDMA system has a pilot signal allocated to a single subcarrier from among N subcarriers, however, the inventive OFDM/OFDMA system according to the present invention can allocate a pilot signal, the size of which is equal to 1/N of that of the conventional pilot signal, to N subcarriers.

The conventional TDM/TDMA system has a pilot signal allocated to a single timeslot from among N timeslots, however, the inventive TDM/TDMA system according to the present invention can apply a pilot signal, the size of which is equal to 1/N of that of the conventional pilot signal, to N timeslots.

The conventional FDM/FDMA system has allocated a pilot signal to a single frequency band from among N frequency bands, however, the inventive FDM/FDMA system according to the present invention can apply a pilot signal, the size of which is equal to 1/N of that of the conventional pilot signal, to N frequency bands.

The conventional CDM/CDMA system has allocated a pilot signal to a single code from among N codes, however, the inventive CDM/CDMA system according to the present invention can apply a pilot signal, the size of which is equal to 1/N of that of the conventional pilot signal, to N codes.

In the case of transmitting N samples in the above-mentioned first preferred embodiment, assuming that a data signal contained in an m-th sample is $d_m$, a pilot signal contained in the m-th sample is $p_m$, a channel corresponding to the sample is h, noise corresponding to the m-th sample is $v_m$, a received signal $x_m$ is represented by the following Equation 1b:

$$x_m = h(d_m + p_m) + v_m \quad \text{[Equation 1b]}$$

In this case, since a receiver has already recognized the value of the pilot signal, it can perform the channel estimation denoted by the following Equation 1c.

For reference, the value of "h" shown in the above-mentioned Equation 1 is a value independent of the value of "m." In other words, it is assumed that the value of h is constant during the transmission of the N samples. Also, the above-mentioned equations are expressed without considering the above-mentioned noise $v_m$.

$$p_m^* x_m = h(p_m^* d_m + 1) + p_m^* v_m \quad \text{[Equation 1c]}$$
$$m = 0, 1, 2, \ldots, N-1$$
$$\hat{h} = \frac{1}{N} \sum_{m=0}^{N-1} p_m^* x_m$$

In Equation 1c, $\hat{h}$ is a channel value estimated by the pilot and data signals configured by the aforementioned method. As described above, if the pilot signals having the same size are contained in all samples and are then transmitted according to the first preferred embodiment, the channel value $\hat{h}$ can be estimated by the above-mentioned Equation 1c.

Also, the estimated channel value can be recovered using the following Equation 1d:

$$x_m / \hat{h} = (h/\hat{h}) \cdot (d_m + p_m) + v_m / \hat{h} \quad \text{[Equation 1d]}$$
$$\cong d_m + p_m + \bar{v}_m$$
$$\hat{d}_m = \text{decision}(x_m / \hat{h} - p_m)$$

If an inventive transmission signal is recovered by the estimated channel value as denoted by Equation 1d, a pilot signal having a predetermined size ($p_m$) is added to each data symbol, such that the data recovery can be implemented by another channel estimation value reduced by the predetermined size ($p_m$).

Second Preferred Embodiment

A second preferred embodiment of the present invention provides a method for transmitting a sample equipped with data and pilot signals. In more detail, the second preferred embodiment provides a method for transmitting the sample including not only the data and pilot signals but also a predetermined auxiliary signal.

As can be seen from Equation 1c of the above-mentioned first preferred embodiment, the value of $$\sum_{m=0}^{N-1} d_m$$

should be close to the value of 0, resulting in the implementation of accurate channel estimation.

Generally, an average value of constellation-mapped data symbols is close to the value of 0. The higher the number of N samples (i.e., N transmission samples), the closer the value of $$\sum_{m=0}^{N-1} d_m$$

is to zero.

However, under the above situation, it is difficult to maintain the independency of the "h" value to the "m" value.

Therefore, the second preferred embodiment of the present invention provides a method for increasing the number (N) of samples to be transmitted, inserting the auxiliary signal to acquire of the value of $$\sum_{m=0}^{N-1} d_m$$

which should be close to the value of 0, this resulting in the implementation of accurate channel estimation.

The above-mentioned second preferred embodiment of the present invention will hereinafter be described with reference to FIGS. 9 to 11.

Figure 9:
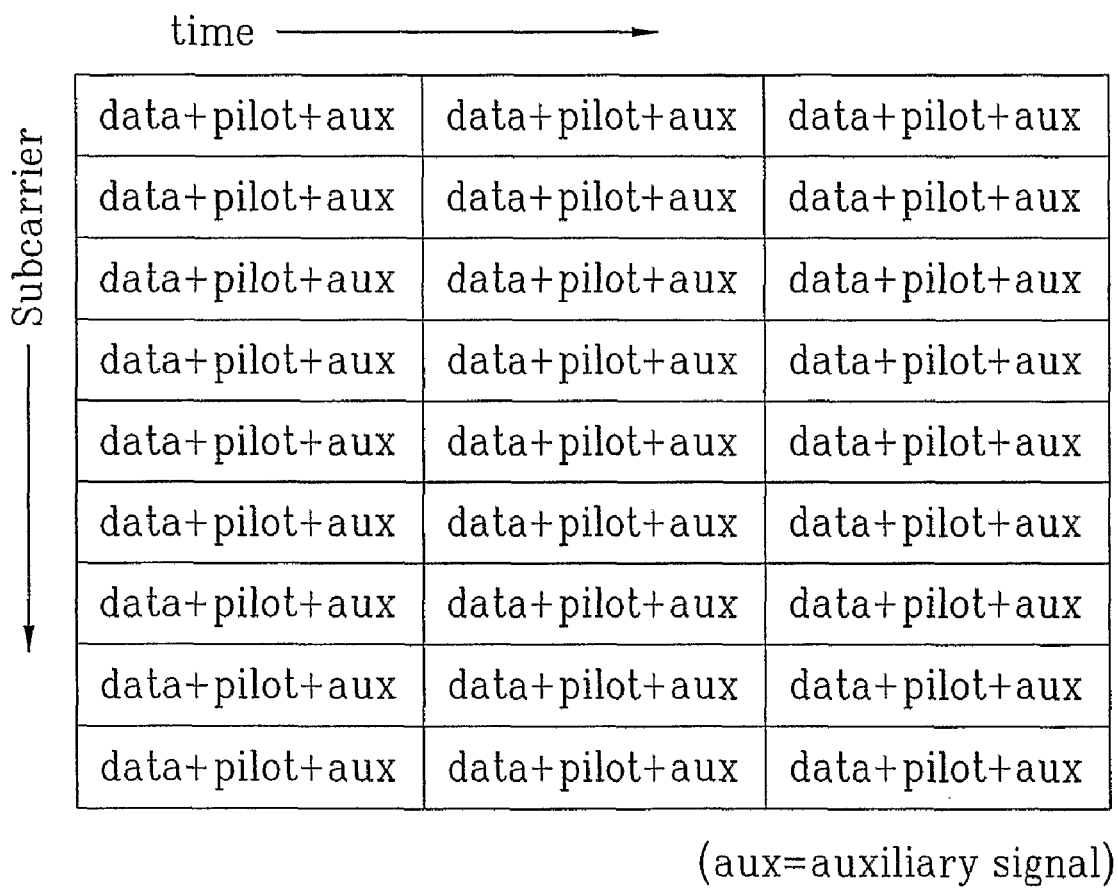
FIG. 9 is a conceptual diagram illustrating an OFDM/OFDMA-based transmission method for inserting an auxiliary signal capable of allowing symbol values of overall samples to converge at zero "0" according to a second preferred embodiment of the present invention.

FIG. 9 is a conceptual diagram illustrating an OFDM/OFDMA-based transmission method for inserting an auxiliary signal capable of allowing symbol values of overall samples to converge at zero "0" according to a second preferred embodiment of the present invention.

Referring to FIG. 9, a predetermined-sized pilot signal and an auxiliary signal are contained in each sample (i.e., a signal transmitted via a specific subcarrier).

Preferably, the above-mentioned pilot signal may have the same value in association with each sample. The auxiliary signal is determined by the data signal contained in all the transmitted samples.

Figure 10:
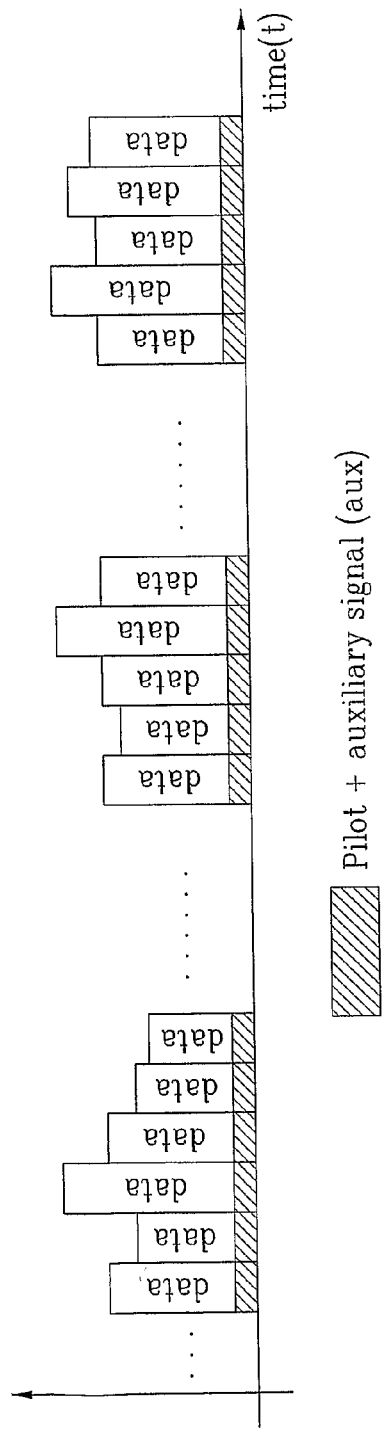
FIG. 10 is a conceptual diagram illustrating a TDM/TDMA-based transmission method for inserting an auxiliary signal capable of allowing symbol values of overall samples to converge at zero "0" according to a second preferred embodiment of the present invention.

FIG. 10 is a conceptual diagram illustrating a TDM/TDMA-based transmission method for inserting an auxiliary signal capable of allowing symbol values of overall samples to converge at zero "0" according to a second preferred embodiment of the present invention.

Referring to FIG. 10, a predetermined-sized pilot signal and an auxiliary signal are contained in each sample (i.e., a signal transmitted via a specific timeslot).

Figure 11:
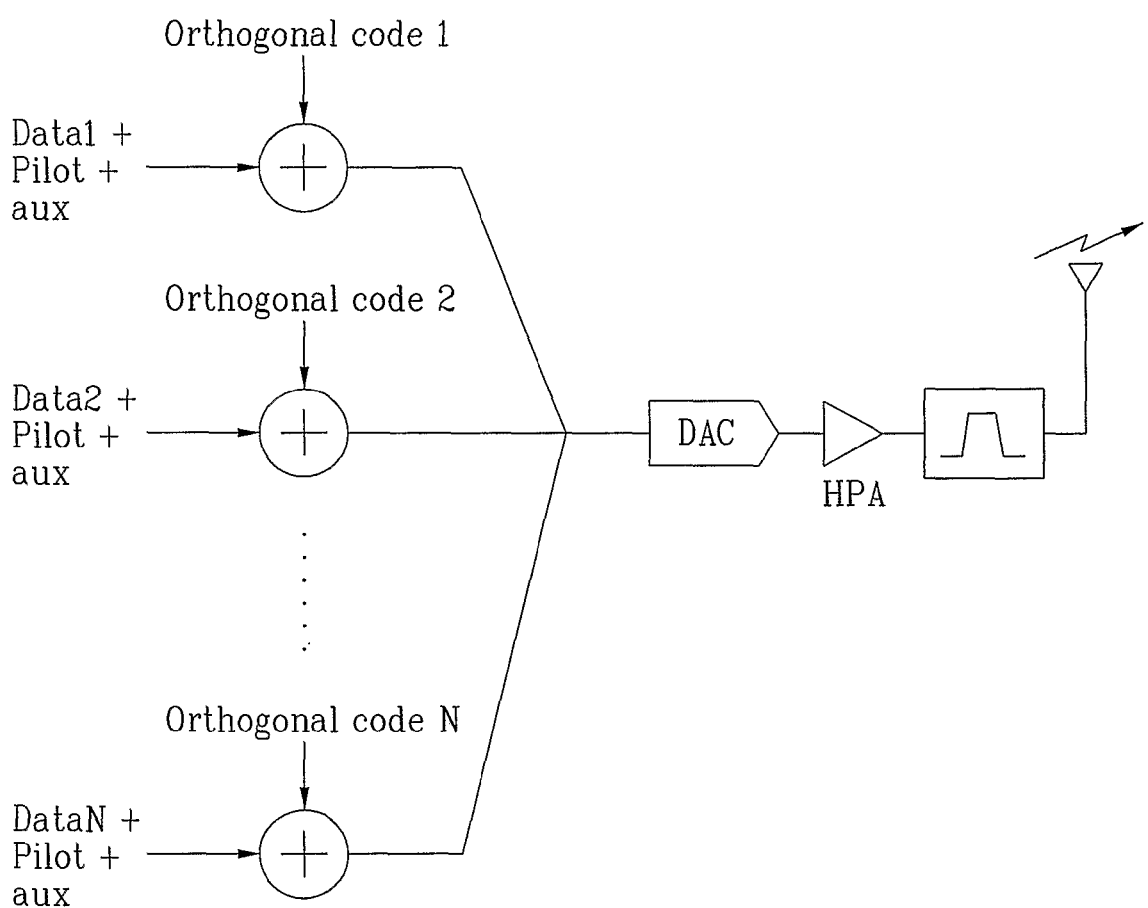
FIG. 11 is a conceptual diagram illustrating a CDM/CDMA-based transmission method for inserting an auxiliary signal capable of allowing symbol values of overall samples to converge at zero "0" according to a second preferred embodiment of the present invention.

FIG. 11 is a conceptual diagram illustrating a CDM/CDMA-based transmission method for inserting an auxiliary signal capable of allowing symbol values of overall samples to converge at zero "0" according to a second preferred embodiment of the present invention.

Referring to FIG. 11, a predetermined-sized pilot signal and an auxiliary signal are contained in each sample (i.e., a signal transmitted via a specific code).

A method for configuring the pilot signal implemented by the FDM/FDMA system is the same as in the above-mentioned method. In other words, a predetermined-sized pilot signal and an auxiliary signal are contained in each sample (i.e., a signal transmitted via a specific frequency band).

The method for creating the above-mentioned auxiliary signal in the above-mentioned communication system is represented by the following Equation 2a:

$$x_m = h(d_m + p_m + a) + v_m \ m=0,1,2,\ldots,N-1 \quad \text{[Equation 2a]}$$

where, "a" is indicative of the auxiliary signal, "$x_m$" is a reception signal received in a reception end, and "m" is index information for the distinction of samples.

In this case, the value of "a" included in data contained in N samples to acquire the sum (i.e., zero) of the data signal and the auxiliary signal is calculated by the following Equation 2b:

$$\sum_{m=0}^{N-1}(d_m + a) = 0 \Leftrightarrow a = \frac{-\sum_{m=0}^{N-1} d_m}{N} \quad \text{[Equation 2b]}$$

The channel estimation denoted by the following Equation 2c is performed on the reception signal ($x_m$) additionally including the value of "a":

$$p_m^* x_m = h(p_m^* d_m + 1 + p_m^* a) + p_m^* v_m = h + p_m^* v_m, \quad \text{[Equation 2c]}$$

$$m = 0, 1, 2, \ldots, N-1$$

$$\hat{h} = \frac{1}{N}\sum_{m=0}^{N-1} p_m^* x_m$$

Also, the data signal of the reception signal ($x_m$) can be restored by the above-mentioned estimated channel value $\hat{h}$ as denoted by the following Equation 2d:

$$x_m/\hat{h} = h/\hat{h} \cdot (d_m + p_m + a) + v_m/\hat{h} \cong d_m + p_m + a$$

$$\hat{d}_m = \text{decision}(x_m/\hat{h} - p_m - a) \quad \text{[Equation 2d]}$$

As can be seen from Equation 2d, not only the data signal but also the pilot signal ($p_m$) and the auxiliary signal (a) are added to each sample, such that the value of a received data symbol is determined by the deletion of the signals ($p_m$) and (a).

If the reception end recognizes the value of (a), the reception signal can be more accurately restored. Therefore, it is desirable that the value of the auxiliary signal (a) associated with N specific samples is transmitted from a transmission end to a reception end.

There is no limitation in the method for transmitting the auxiliary signal to the reception end. If the value of the auxiliary signal (a) is transmitted to the reception end using messages or signaling processes of physical and upper layers, the reception end can correctly recover the data value using the value of the received auxiliary signal (a).

The reception signal according to the second preferred embodiment of the present invention is channel-estimated by the following inverse matrix denoted by the following Equation 2e, resulting in the data recovery.

$$x_m/\hat{h} = h/\hat{h}(d_m + p_m + a) + v_m/\hat{h} \cong d_m + p_m + a + \overline{v}_m \quad \text{[Equation 2e]}$$

$$z_m = x_m/\hat{h} - p_m \cong d_m + a + \overline{v}_m$$

$$\begin{bmatrix} z_0 \\ z_1 \\ \vdots \\ z_{N-1} \end{bmatrix} =$$

-continued $$\frac{1}{N}\begin{bmatrix} N-1 & -1 & \ldots & -1 \\ -1 & N-1 & \ldots & -1 \\ \vdots & \vdots & \ddots & \vdots \\ -1 & -1 & \ldots & N-1 \end{bmatrix}\begin{bmatrix} d_0 \\ d_1 \\ \vdots \\ d_{N-1} \end{bmatrix} + \begin{bmatrix} \overline{v}_0 \\ \overline{v}_1 \\ \vdots \\ \overline{v}_{N-1} \end{bmatrix} \cong$$

$$\frac{1}{N}\begin{bmatrix} N-1 & -1 & \ldots & 0 \\ 0 & N-1 & \ldots & -1 \\ \vdots & \vdots & \ddots & \vdots \\ -1 & -1 & \ldots & N-1 \end{bmatrix}\begin{bmatrix} d_0 \\ d_1 \\ \vdots \\ d_{N-1} \end{bmatrix} + \begin{bmatrix} \overline{v}_0 \\ \overline{v}_1 \\ \vdots \\ \overline{v}_{N-1} \end{bmatrix}$$

$$z = Md + \overline{v}$$

$$\hat{d} = \begin{cases} M^{-1}z & \text{for } ZF \\ \left(M^2 + \frac{1}{SNR}I\right)^{-1} Mz & \text{for } MMSE \end{cases}$$

$M$: circulant matrix $\Rightarrow M =$ $$F^H \sum F \text{ where } F \text{ is a } DFT \text{ matrix}$$

In the recovered data symbol, a Signal-to-Noise Ratio (SNR) is reflected in Minimum Mean Squared Error (MMSE) technique, differently from the ZF (Zero Forcing) technique.

Third Preferred Embodiment

A third preferred embodiment of the present invention provides a method for transmitting a sample simultaneously including the data, pilot, and auxiliary signals. In more detail, the third preferred embodiment of the present invention provides a transmission/reception method for preventing the occurrence of transmission power waste caused by the auxiliary signal.

If the pilot signal is constructed according to the above-mentioned second preferred embodiment, a transmission end must additionally employ as much power as the value of a specific constant (a) to supplement the auxiliary signal value.

However, under the above-mentioned situation, it may be impossible to increase the power of the transmission end. In this case, the amplitude of all transmission power is limited, such that the amplitude of the data signal may be unavoidably reduced due to the limited power amplitude. In other words, the amplitude of the data signal may be unavoidably reduced due to the addition of the auxiliary signal.

Therefore, the above-mentioned third preferred embodiment of the present invention provides a method for coding the value of the data signal using a predetermined data value and a predetermined auxiliary signal value.

As a representative example of a variety of coding methods for limiting the sum of the data signal and the auxiliary signal to a specific range, a method for modulo-calculating a difference between the data signal value and the auxiliary signal value with respect to a predetermined data value Δ will hereinafter be described in detail.

As described above, the auxiliary signal value (a) associated with N samples should be transmitted to the reception end. Also, the reception end recognizes the above-mentioned predetermined data value Δ used for the coding.

A transmitter according to the third preferred embodiment of the present invention calculates the auxiliary signal associated with N samples transmitted to the reception end, performs modulo-calculation considering the difference between the data and auxiliary signals contained in the afore-mentioned sample, performs the coding of reducing transmission power using the modulo-calculation, and transmits the coded value instead of the real data signal value.

$$x_m = h(\overline{d}_m + p_m + a) + v_m \quad \text{[Equation 3a]}$$
$$m = 0, 1, 2, \ldots, N-1$$

where $$\sum_{m=0}^{N-1}(d_m + a) = 0 \Leftrightarrow a = \frac{-\sum_{m=0}^{N-1} d_m}{N}$$

$$\overline{d}_m = (d_m - a) \bmod \Delta$$

In Equation 3a, "$d_m$" is the value of a real data signal, $\overline{d}_m$ is a coded signal transmitted from a transmission end to a reception end, mod is indicative of the modulo-calculation, "$p_m$" is a pilot signal, "a" is an auxiliary signal, and "m" is index information for the distinction of samples.

In this case, upon receiving the signal $\overline{d}_m$, the pilot signal ($p_m$), and the auxiliary signal (a), the reception end can perform the channel estimation using the following Equation 3b:

$$p_m^* x_m = h(p_m^* \overline{d}_m + 1 + p_m^* a) + p_m^* v_m \quad \text{[Equation 3b]}$$
$$m = 0, 1, 2, \ldots, N-1$$
$$\hat{h} = \frac{1}{N}\sum_{m=1}^{N} p_m^* x_m$$

The data recovery is executed by the above-mentioned estimated channel value $\hat{h}$ as denoted by the following Equation 3c:

$$x_m / \hat{h} = h/\hat{h}(\overline{d}_m + p_m + a) + v_m/\hat{h} \cong \overline{d}_m + p_m + a + \overline{v}_m \quad \text{[Equation 3c]}$$
$$z_m = x_m/\hat{h} - p_m \cong \overline{d}_m + a + \overline{v}_m$$
$$\hat{d}_m = \text{decision}(z_m \bmod \Delta)$$

In accordance with the above-mentioned third preferred embodiment, the value of a real data signal ($d_m$) is coded to a smaller-sized signal $\overline{d}_m$ such that it can solve the problem of increasing the transmission signal power by the sum of the auxiliary signal and the pilot signal.

The above-mentioned third preferred embodiment of the present invention will hereinafter be described with reference to FIGS. 12 to 14.

Figure 12:
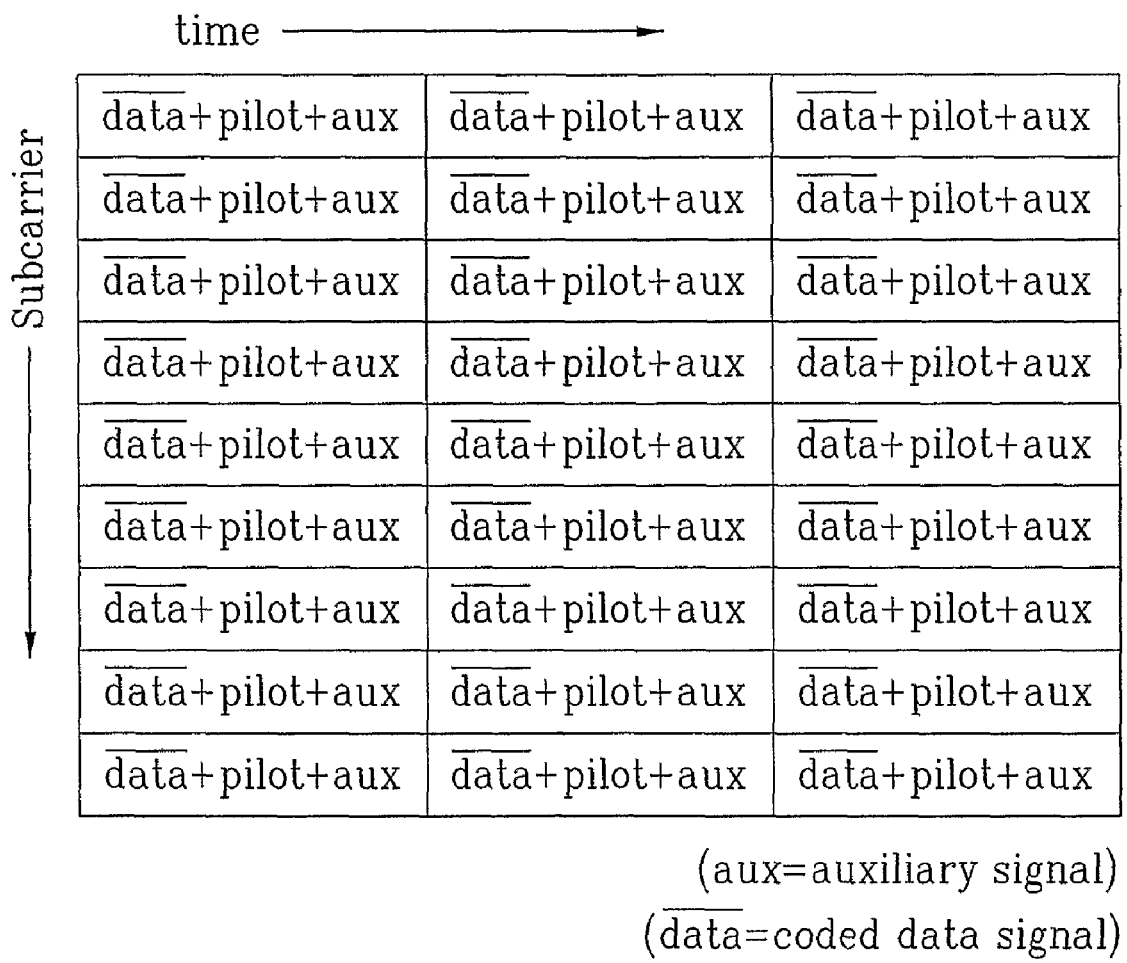
FIG. 12 is a conceptual diagram illustrating a method for configuring a pilot signal using the OFDM/OFDMA system according to a third preferred embodiment of the present invention.

FIG. 12 is a conceptual diagram illustrating a method for configuring a pilot signal using the OFDM/OFDMA system according to a third preferred embodiment of the present invention.

A method for constructing the pilot signal in the OFDM/OFDMA system according to the third preferred embodiment of the present invention will hereinafter be described with reference to FIG. 12.

Referring to FIG. 12, a data signal and a pilot signal are simultaneously contained in each sample (i.e., a signal transmitted via a specific subcarrier). However, it should be noted that the coding method for reducing the transmission signal power is applied to the above-mentioned data signal as denoted by the above Equation 3a.

Figure 13:
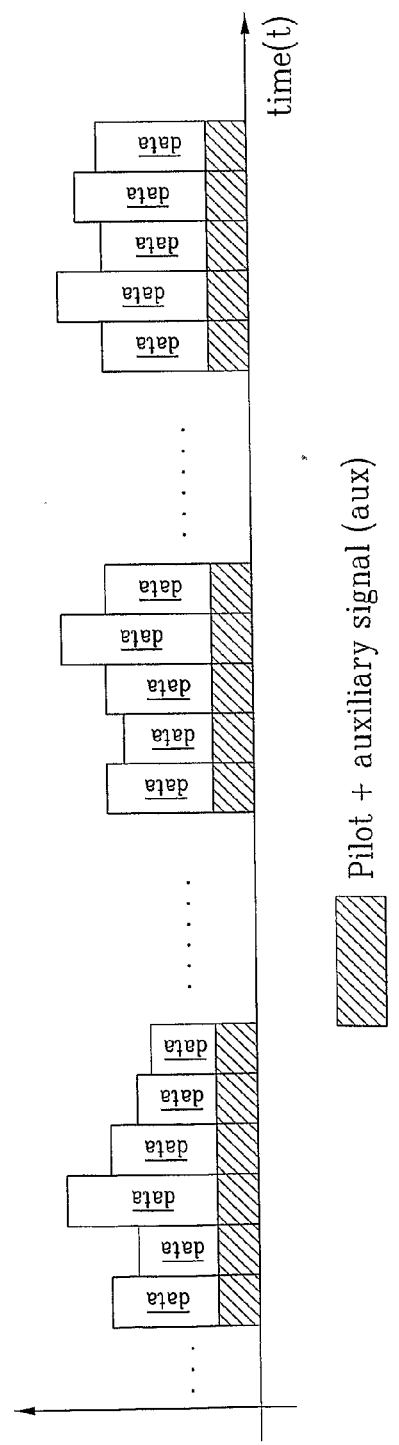
FIG. 13 is a conceptual diagram illustrating a method for configuring a pilot signal using the TDM/TDMA system according to a third preferred embodiment of the present invention.

FIG. 13 is a conceptual diagram illustrating a method for constructing a pilot signal using the TDM/TDMA system according to a third preferred embodiment of the present invention.

Referring to FIG. 13, a predetermined-sized pilot signal and an auxiliary signal are contained in each sample (i.e., a signal transmitted via a specific timeslot). However, it should be noted that the coding method for reducing the transmission signal power is applied to the above-mentioned data signal as denoted by the above Equation 3a.

Figure 14:
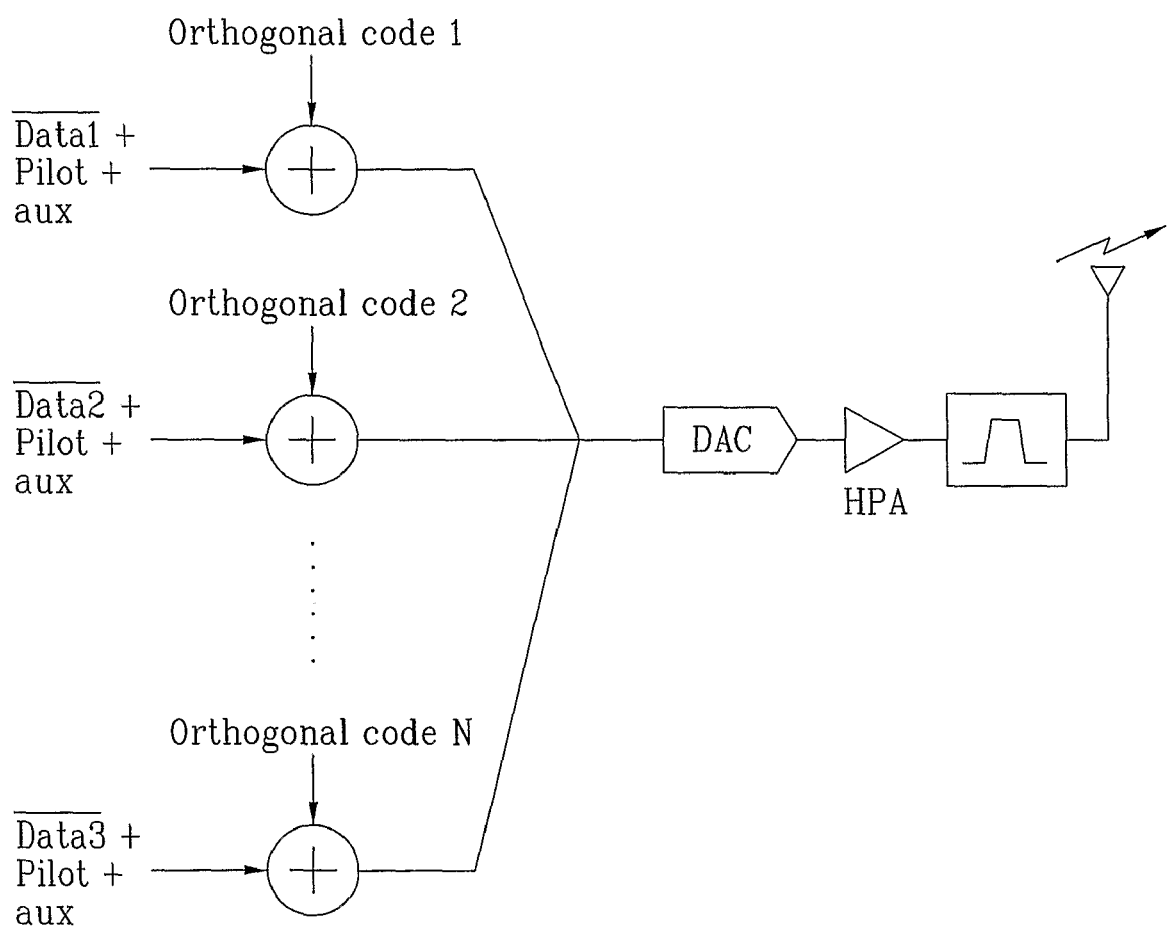
FIG. 14 is a conceptual diagram illustrating a method for configuring a pilot signal using the CDM/CDMA system according to a third preferred embodiment of the present invention.

FIG. 14 is a conceptual diagram illustrating a method for configuring a pilot signal using the CDM/CDMA system according to a third preferred embodiment of the present invention.

Referring to FIG. 14, a predetermined-sized pilot signal and an auxiliary signal are contained in each sample (i.e., a signal transmitted via a specific code). However, it should be noted that the coding method for reducing the transmission signal power is applied to the above-mentioned data signal as denoted by the above Equation 3a.

A method for constructing the pilot signal implemented by the FDM/FDMA system is the same as in the above-mentioned method. In other words, a predetermined-sized pilot signal and an auxiliary signal are contained in each sample (i.e., a signal transmitted via a specific frequency band). However, it should be noted that the coding method for reducing the transmission signal power is applied to the above-mentioned data signal as denoted by the above Equation 3a.

Fourth Preferred Embodiment

A fourth preferred embodiment of the present invention provides a method for adding a predetermined pilot signal to a sample transmitted to a reception end, and controlling a phase of the added pilot signal.

In the case of controlling the phase of the added pilot signal, the phase of the pilot signal is rotated by a predetermined angle 0°, such that the pilot signal remains in a positive (+) value. Otherwise, if the phase of the pilot signal is rotated by 180°, the pilot signal is shifted from the positive (+) value to a negative (−) value.

In this way, the pilot signals having different signs or phases are added to the sample, such that it can transmit the above-mentioned transmission signal via a plurality of antennas.

Figure 15:
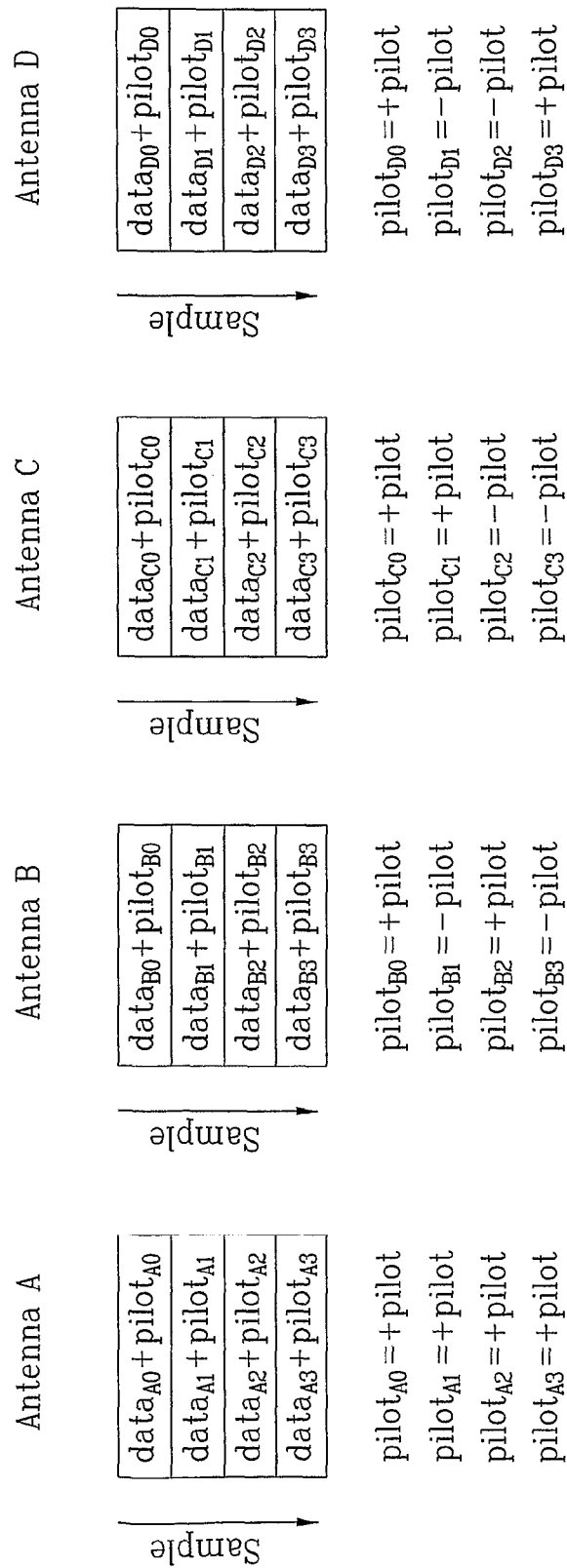
FIG. 15 shows samples transmitted via four antennas according to a preferred embodiment of the present invention.

FIG. 15 shows samples transmitted via four antennas according to a preferred embodiment of the present invention.

Referring to FIG. 15, each sample simultaneously includes a data signal and a pilot signal. According to the fourth preferred embodiment of the present invention, predetermined pilot signals are contained in a sample transmitted to a reception end, and the phases of the pilot signals are determined by Hadamard codes.

As can be seen from FIG. 15, predetermined pilot signals are added to each sample transmitted via each antenna. The example of FIG. 15 shows a method for transmitting a total of four samples via four antennas, respectively.

For example, individual samples transmitted via the four antennas are depicted in FIG. 15. In more detail, four samples are transmitted via an antenna A. In this case, each of the four samples associated with the above-mentioned antenna A includes a data signal and a pilot signal. The samples received via the antenna A include only the positive (+) pilot signals. Each of four samples transmitted via each of antennas B, C, and D alternately includes the positive (+) pilot signal and the negative (−) pilot signal.

If the concept of FIG. 15 is applied to the OFDM/OFDMA system, four samples are transmitted via four antennas. In this case, the above-mentioned four samples may be transmitted via 4 different subcarriers at the same time, may be transmitted via 2 different subcarriers two times, or may also be transmitted via a single subcarrier four times, in such a way that the above-mentioned four samples can be transmitted in various ways.

If the concept of FIG. 15 is applied to the TDM/TDMA system, four samples (i.e., signals transmitted via four timeslots) may include $pilot_{x0}$ $pilot_{x1}$, $pilot_{x2}$, and $pilot_{x3}$ (where x=A, B, C, D), respectively, and may then be transmitted.

Also, if the concept of FIG. 15 is applied to the FDM/FDMA system, four samples (i.e., signals transmitted via four codes) may include $pilot_{x0}$, $pilot_{x1}$ $pilot_{x2}$, and $pilot_{x3}$ (where x=A, B, C, D), respectively, and may then be transmitted.

For the convenience of description and better understanding of the present invention, assuming that the amplitude of the pilot signal shown in FIG. 15 is "1", the arrangement of pilot signals added to the above-mentioned four antennas can be represented by the following Equation 4a:

$$\begin{bmatrix} +1 & +1 & +1 & +1 \\ +1 & -1 & +1 & -1 \\ +1 & +1 & -1 & -1 \\ +1 & -1 & -1 & +1 \end{bmatrix}$$ [Equation 4a]

In Equation 4a, each column is indicative of a specific antenna, and each row is indicative of a pilot signal added to a specific sample (e.g., an i-th sample) transmitted via all antennas. In other words, a first column is indicative of a pilot signal added to the antenna A, and a first row is indicative of a pilot signal added to a first sample transmitted via the antennas A, B, C, and D.

As can be seen from FIG. 15 and the above-mentioned Equation 4a, pilot signals transmitted via individual antennas are orthogonal to each other.

If the reception end receives a signal via a single antenna, there are four reception paths. In this case, all the pilot signals of the samples transmitted via four paths are orthogonal to each other, such that the reception end can normally perform the channel estimation.

As described above, although the above-mentioned fourth preferred embodiment of the present invention has disclosed the signal transmission via four antennas, it should be noted that the number of the above-mentioned antennas is not limited to the exemplary value "4", and can be applied to other examples as necessary.

Also, although the above-mentioned fourth preferred embodiment of the present invention has disclosed the data transmission/reception method capable of transmitting four samples, it should be noted that the number of the above-mentioned samples is not limited to the value "4", and can be applied to other examples as necessary.

If an OFDM symbol including 4 data symbols is transmitted via two antennas, the arrangement of pilot signals can be represented by the following Equation 4b:

$$\begin{bmatrix} +1 & +1 \\ +1 & -1 \\ +1 & +1 \\ +1 & -1 \end{bmatrix}$$ [Equation 4b]

In Equation 4b, each column is indicative of a specific antenna, and each row is indicative of a pilot signal added to a specific sample (e.g., an i-th sample) transmitted via all antennas.

Also, although the above-mentioned fourth preferred embodiment of the present invention has disclosed the data transmission/reception method for transmitting four samples, it should be noted that there is no limitation in the number of the samples.

If eight samples are transmitted via four antennas, the arrangement of pilot signals can be represented by the following Equation 4c:

$$\begin{bmatrix} +1 & +1 & +1 & +1 \\ +1 & -1 & +1 & -1 \\ +1 & +1 & -1 & -1 \\ +1 & -1 & -1 & +1 \\ +1 & +1 & +1 & +1 \\ +1 & -1 & +1 & -1 \\ +1 & +1 & -1 & -1 \\ +1 & -1 & -1 & +1 \end{bmatrix}$$ [Equation 4c]

In Equation 4c, each column is indicative of a specific antenna, and each row is indicative of a pilot signal added to a specific sample (e.g., an i-th sample) transmitted via all antennas.

Figure 16:
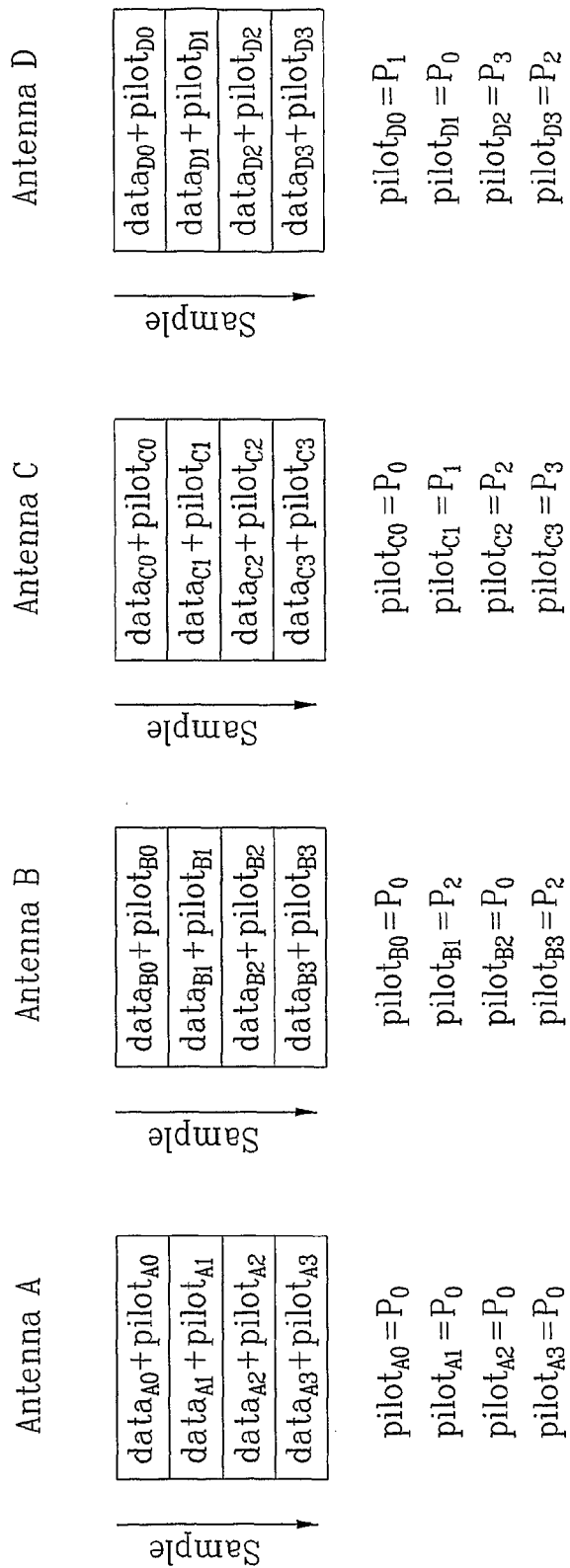
FIG. 16 shows samples transmitted via four antennas according to another preferred embodiment of the present invention.

FIG. 16 shows samples transmitted via four antennas according to another preferred embodiment of the present invention.

The preferred embodiment shown in FIG. 16 provides a method for modifying an added pilot signal using a QPSK orthogonal code in order to apply the above-mentioned first preferred embodiment to a multi-antenna system.

Referring to FIG. 16, a predetermined pilot signal is added to each data transmitted via individual antennas. As can be seen from FIG. 16, the pilot signal is contained in each of four samples, and is then transmitted.

Also, the preferred embodiment of FIG. 16 shows an exemplary case in which the pilot signal is contained in each of four samples, such that the four samples including the pilot signals are transmitted to a destination. As can be seen from FIG. 16, four samples are transmitted via the antenna A, and each of the four samples includes the value of $P_0$.

In the meantime, four samples transmitted via the antenna B, C, or D selectively includes $$P_0^{\left(P_0 = e^{j\frac{\pi}{4}}\right)},$$

$$P_1^{\left(P_1 = e^{j\frac{3\pi}{4}}\right)},$$

$$P_2\begin{pmatrix}P_2=e^{-j\frac{3\pi}{4}}\end{pmatrix},$$

and $$P_3\begin{pmatrix}P_3=e^{-j\frac{\pi}{4}}\end{pmatrix}.$$

For the convenience of description and better understanding of the present invention, assuming that individual added pilot signals of FIG. 16 are $P_0$, $P_1$, $P_2$, and $P_3$, the arrangement of pilot signals added to the four antennas can be represented by the following Equation 4d:

$$\begin{bmatrix} P_0 & P_0 & P_0 & P_1 \\ P_0 & P_2 & P_1 & P_0 \\ P_0 & P_0 & P_2 & P_3 \\ P_0 & P_2 & P_3 & P_2 \end{bmatrix}$$ [Equation 4d]

In Equation 4d, each column is indicative of a specific antenna, and each row is indicative of a pilot signal added to a specific sample (e.g., an i-th sample) transmitted via all antennas. In other words, a first column is indicative of a pilot signal contained in each sample transmitted via the antenna A, and a first row is indicative of a pilot signal contained in each sample transmitted via the antennas A, B, C, and D. As can be seen from FIG. 16 and the above-mentioned Equation 4d, signals transmitted via individual antennas are orthogonal to each other.

If the reception end receives signals via a single antenna, there are four reception paths. In this case, all the pilot signals of the samples transmitted via four paths are orthogonal to each other, such that the reception end can normally perform the channel estimation.

As described above, although the above-mentioned preferred embodiment of the present invention has disclosed the signal transmission via four antennas, it should be noted that the number of the above-mentioned antennas is not limited to the exemplary value "4", and can be applied to other examples as necessary.

If 4 data samples are transmitted via two antennas, the arrangement of pilot signals can be represented by the following Equation 4e:

$$\begin{bmatrix} P_0 & P_0 \\ P_0 & P_2 \\ P_0 & P_0 \\ P_0 & P_2 \end{bmatrix}$$ [Equation 4e]

In Equation 4e, each column is indicative of a specific antenna, and each row is indicative of a pilot signal added to a specific sample (e.g., an i-th sample) transmitted via all antennas.

Also, although the above-mentioned preferred embodiment of the present invention has disclosed the data transmission/reception method for transmitting four samples, it should be noted that there is no limitation in the number of the samples.

If eight samples are transmitted via four antennas, the arrangement of pilot signals can be represented by the following Equation 4f:

$$\begin{bmatrix} P_0 & P_0 & P_0 & P_1 \\ P_0 & P_2 & P_1 & P_0 \\ P_0 & P_0 & P_2 & P_3 \\ P_0 & P_2 & P_3 & P_2 \\ P_0 & P_0 & P_0 & P_1 \\ P_0 & P_2 & P_1 & P_0 \\ P_0 & P_0 & P_2 & P_3 \\ P_0 & P_2 & P_3 & P_2 \end{bmatrix}$$ [Equation 4f]

In Equation 4f, each column is indicative of a specific antenna, and each row is indicative of a pilot signal added to a specific sample (e.g., an i-th sample) transmitted via all antennas.

Fifth Preferred Embodiment

A fifth preferred embodiment of the present invention additionally includes an auxiliary signal (aux) in the pilot signal of the above-mentioned fourth preferred embodiment of the present invention. By the addition of the auxiliary signal (aux), the sum of data signals contained in all transmission samples can converge at zero.

Figure 17:
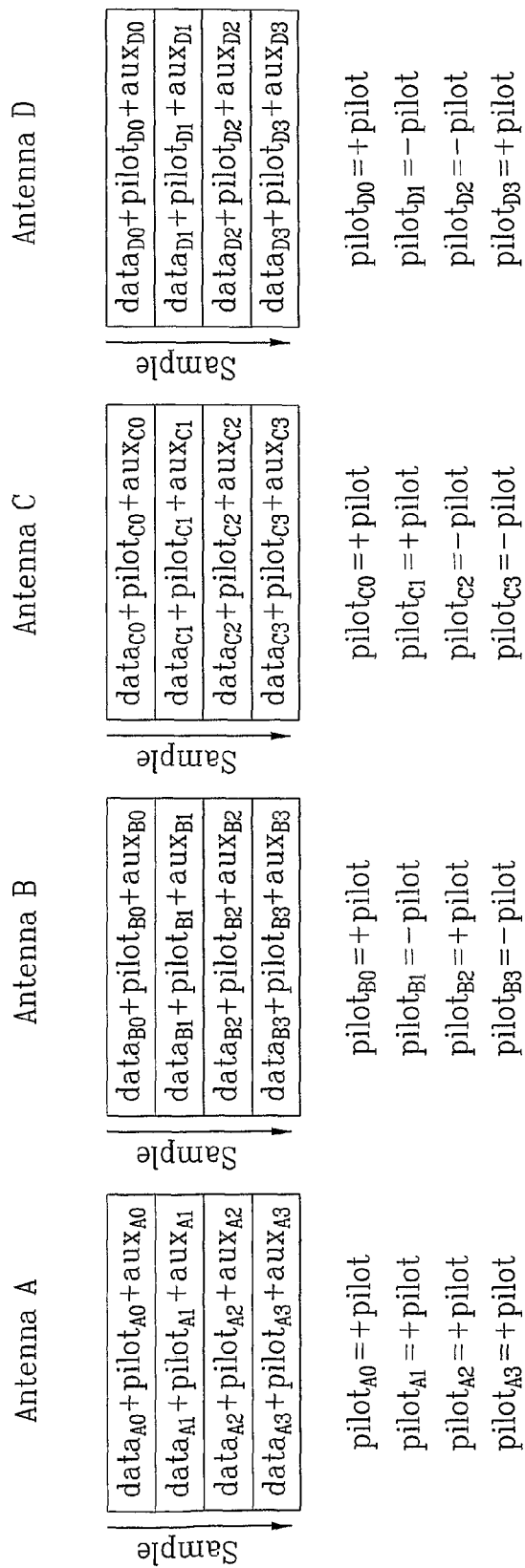
FIG. 17 shows samples transmitted via four antennas by the sum of orthogonal pilot signals according to the present invention.

FIG. 17 shows samples transmitted via four antennas by the sum of orthogonal pilot signals according to the present invention.

Although FIG. 17 shows an exemplary method for transmitting an OFDM symbol equipped with four data symbols via four antennas, it should be noted that the aforementioned data transmission method of FIG. 17 can transmit data via a variety of antennas other than the four antennas as previously stated in the above-mentioned fourth preferred embodiment, and can transmit a variety of samples via individual antennas.

The fifth preferred embodiment of FIG. 17 provides a method for modifying/arranging pilot symbols using Hadamard code in order to apply the above-mentioned second preferred embodiment to the multi-antenna system.

Also, the fifth preferred embodiment of FIG. 17 provides a method for additionally including the auxiliary signal (aux) capable of allowing the sum of data symbols of a specific OFDM symbol to converge at zero.

The above-mentioned pilot arrangement has previously been disclosed in the preferred embodiment of FIG. 15, such that a method for calculating the auxiliary signal (aux) will hereinafter be described in detail.

If the number of transmission antennas is $N_t$, a method for calculating the auxiliary signal (aux) according to the number of transmission antenna $N_t$ is as follows.

The exemplary case of $N_t=1$ is the same as the above-mentioned second preferred embodiment.

Provided that the auxiliary signal is a specific constant "a", a reception signal of a receiver can be represented by the following Equation 5a:

$$x_m = h(d_m + p_m + a) + v_m \quad m=0,1,2,\ldots,N-1$$ [Equation 5a]

In this case, the value "a" for allowing the sum of the data and auxiliary signals contained in N samples to be zero can be calculated by the following Equation 5b:

$$\sum_{m=0}^{N-1}(d_m + a) = 0 \Leftrightarrow a = \frac{-\sum_{m=0}^{N-1}d_m}{N}$$ [Equation 5b]

where "m" is indicative of index information for the distinction of the samples.

The Equations 5a~5b are equal to the above-mentioned Equations 2a~2b.

Under the situation of $N_t=2$, the auxiliary signal can be calculated by the following method.

Under the situation of two transmission antennas (i.e., antennas A and B), a reception signal of the receiver can be represented by the following Equation 5c:

$$x_m = h_A(d_{Am} + p_{Am} + a_{Am}) + h_B(d_{Bm} + p_{Bm} + a_{Bm}) + v_m \quad m=0,1,2,\ldots,N-1$$ [Equation 5c]

In this case, auxiliary signal values $a_{Am}$ and $a_{Bm}$ for adding N data symbols and N auxiliary signals (where N=the number of transmission samples) to acquire the sum of zero can be calculated by the following processes 1a and 2a.

Process 1a

If the value of $h_A$ is estimated by N samples of a reception signal (assuming that $h_A$ is constant for each sample), the data signal, the auxiliary signal, and the pilot signal contained in the N samples can be represented by the following Equation 5d:

$$\sum_{m=0}^{N-1} x_m =$$ [Equation 5d]

$$h_A\left(\sum_{m=0}^{N-1} d_{Am} + Np + \sum_{m=0}^{N-1} a_{Am}\right) + h_B\left(\sum_{m=0}^{N-1} d_{Bm} + 0 + \sum_{m=0}^{N-1} a_{Bm}\right)$$

As can be seen from Equation 5d, pilot signals of signals transmitted via the antenna A are added to be $$\sum_{m=0}^{N-1} p_{Am} = Np$$

without converging at zero. Otherwise, pilot signals of signals transmitted via the antenna B are added to be $$\sum_{m=0}^{N-1} p_{Bm} = 0,$$

however, it should be noted that noise is ignored in Equation 5d to establish $$\sum_{m=0}^{N-1} v_m \simeq 0.$$

In conclusion, in order to calculate the value "$h_A$" using the above-mentioned process 1a, the values of individual auxiliary signals $a_{Am}$ and $a_{Bm}$ are required to satisfy $$\sum_{m=0}^{N-1} d_{Am} + \sum_{m=0}^{N-1} a_{Am} = 0 \text{ and } \sum_{m=0}^{N-1} d_{Bm} + \sum_{m=0}^{N-1} a_{Bm} = 0.$$

Process 2a

If the value of $h_B$ is estimated by the data signals, pilot signals and auxiliary signals transmitted via N samples of a reception signal (assuming that $h_B$ is constant for each sample), the sum of signals received through the N samples can be represented by the following Equation 5e:

$$\sum_{m=0}^{N/2-1} (x_{2m} - x_{2m+1}) =$$ [Equation 5e]

$$h_A\left(\sum_{m=0}^{N/2-1} (d_{A(2m)} + a_{A(2m)}) - \sum_{m=0}^{N/2-1} (d_{A(2m+1)} + a_{A(2m+1)}) + 0\right) + h_B\left(\sum_{m=0}^{N/2-1} (d_{B(2m)} + a_{B(2m)}) - \sum_{m=0}^{N/2-1} (d_{B(2m+1)} + a_{B(2m+1)}) + Np\right)$$

As can be seen from Equation 5e, pilot signals of signals transmitted via the antenna A are added to be zero. Otherwise, pilot signals of signals transmitted via the antenna B are added to be the value of $N_p$ (assuming that noise is ignored in Equation 5e so that $$\sum_{m=0}^{N-1} v_m \simeq 0$$

is established).

In conclusion, in order to calculate the value "$h_B$" using the above-mentioned process 2a, the values of individual auxiliary signals $a_{Am}$ and $a_{Bm}$ are required to satisfy specific conditions denoted by $$\sum_{m=0}^{N/2-1} (d_{A(2m)} + a_{A(2m)}) = 0,$$

$$\sum_{m=0}^{N/2-1} (d_{A(2m+1)} + a_{A(2m+1)}) = 0,$$

$$\sum_{m=0}^{N/2-1} (d_{B(2m)} + a_{B(2m)}) = 0,$$

and $$\sum_{m=0}^{N/2-1} (d_{B(2m+1)} + a_{B(2m+1)}) = 0.$$

A method for calculating the values of the auxiliary signals $a_{Am}$ and $a_{Bm}$ using the above-mentioned processes 1a and 2a can be generally represented by the following Equation 5f:

$$a_{A(2m)} = \frac{-\sum_{m=0}^{N/2-1} d_{A(2m)}}{N/2},$$ [Equation 5f]

$$a_{A(2m+1)} = \frac{-\sum_{m=0}^{N/2-1} d_{A(2m+1)}}{N/2},$$

-continued $$a_{B(2m)} = \frac{-\sum_{m=0}^{N/2-1} d_{B(2m)}}{N/2},$$

$$a_{B(2m+1)} = \frac{-\sum_{m=0}^{N/2-1} d_{B(2m+1)}}{N/2},$$

$$m = 0, 1, 2, \ldots N/2-1$$

If the auxiliary signals for satisfying the above-mentioned conditions are added to each other, and the sum of the auxiliary signals is transmitted via two transmission antennas, accurate channel estimation can be performed to recover the values $h_A$ and $h_B$.

An exemplary case of $N_t=4$ calculates the auxiliary signals using the following method.

If four transmission antennas (i.e., antennas A, B, C, and D) are used, signals received in the receiver can be represented by the following Equation 5g:

$$x_m = h_A(d_{Am} + p_{Am} + a_{Am}) + h_B(d_{Bm} + p_{Bm} + a_{Bm}) + h_C(d_{Cm} + p_{Cm} + a_{Cm}) + h_D(d_{Dm} + p_{Dm} + a_{Dm}) + v_m, \quad m = 0, 1, 2, \ldots, N-1 \quad \text{[Equation 5g]}$$

In this case, auxiliary signal values $a_{Am}$, $a_{Bm}$, $a_{Cm}$ and $a_{Dm}$ for adding N data signals and N auxiliary signals (where N means the number of all transmission samples) to acquire the sum of zero can be calculated by the following processes $1b\sim4b$.

Process $1b$

If the value of $h_A$ is estimated by pilot and auxiliary signals contained in N samples of a reception signal (assuming that $h_A$ is constant for each subcarrier), the data signal, signals received via the N samples are added as denoted by the following Equation 5h:

$$\sum_{m=0}^{N-1} x_m = h_A\left(\sum_{m=0}^{N-1} d_{Am} + Np + \sum_{m=0}^{N-1} a_{Am}\right) + \quad \text{[Equation 5h]}$$

$$h_B\left(\sum_{m=0}^{N-1} d_{Bm} + 0 + \sum_{m=0}^{N-1} a_{Bm}\right) +$$

$$h_C\left(\sum_{m=0}^{N-1} d_{Cm} + 0 + \sum_{m=0}^{N-1} a_{Cm}\right) + h_D\left(\sum_{m=0}^{N-1} d_{Dm} + 0 + \sum_{m=0}^{N-1} a_{Dm}\right)$$

As can be seen from Equation 5h, pilot signals of signals transmitted via the antenna A are added to be $$\sum_{m=0}^{N-1} p_{Am} = Np$$

without converging at zero. Otherwise, pilot signals of signals transmitted via the antennas B, C, and D are added to be $$\sum_{m=0}^{N-1} p_{Bm} = \sum_{m=0}^{N-1} p_{Cm} = \sum_{m=0}^{N-1} p_{Dm} = 0,$$

however, it should be noted that noise is ignored in Equation 5h to establish $$\sum_{m=0}^{N-1} v_m \simeq 0.$$

In conclusion, in order to calculate the value "$h_A$" using the above-mentioned process $1b$, the values of individual auxiliary signals $a_{Am}$ and $a_{Bm}$ are required to satisfy $$\sum_{m=0}^{N-1} d_{Am} + \sum_{m=0}^{N-1} a_{Am} = 0, \quad \sum_{m=0}^{N-1} d_{Bm} + \sum_{m=0}^{N-1} a_{Bm} = 0,$$

$$\sum_{m=0}^{N-1} d_{Cm} + \sum_{m=0}^{N-1} a_{Cm} = 0, \text{ and } \sum_{m=0}^{N-1} d_{Dm} + \sum_{m=0}^{N-1} a_{Dm} = 0.$$

Process $2b$

If the value of $h_B$ is estimated by the data signals, pilot signals, and auxiliary signals transmitted via N samples of a reception signal (assuming that $h_B$ is constant for each sample), the sum of signals received through the N samples can be represented by the following Equation 5i:

$$\sum_{m=0}^{N/2-1}(x_{2m} - x_{2m+1}) = h_A\left(\sum_{m=0}^{N/2-1}(d_{A(2m)} + a_{A(2m)}) - \sum_{m=0}^{N/2-1}(d_{A(2m+1)} + a_{A(2m+1)}) + 0\right) + \quad \text{[Equation 5i]}$$

$$h_B\left(\sum_{m=0}^{N/2-1}(d_{B(2m)} + a_{B(2m)}) - \sum_{m=0}^{N/2-1}(d_{B(2m+1)} + a_{B(2m+1)}) + Np\right) + h_C\left(\sum_{m=0}^{N/2-1}(d_{C(2m)} + a_{C(2m)}) - \sum_{m=0}^{N/2-1}(d_{C(2m+1)} + a_{C(2m+1)}) + 0\right) +$$

$$h_D\left(\sum_{m=0}^{N/2-1}(d_{D(2m)} + a_{D(2m)}) - \sum_{m=0}^{N/2-1}(d_{D(2m+1)} + a_{D(2m+1)}) + 0\right)$$

As can be seen from Equation 5i, pilot signals of signals transmitted via the antenna A, C, and D are added to be zero. Otherwise, pilot signals of signals transmitted via the antenna B are added to be the value of $N_p$ (assuming that noise is ignored in Equation 5i so that $$\sum_{m=0}^{N-1} v_m \simeq 0$$

is established).

In conclusion, in order to calculate the value "$h_B$" using the above-mentioned process $2b$, the values of individual auxiliary signals $a_{Am}$, $a_{Bm}$, $a_{Cm}$, and $a_{Dm}$ are required to satisfy specific conditions denoted by $$\sum_{m=0}^{N/2-1}(d_{A(2m)}+a_{A(2m)})=0, \sum_{m=0}^{N/2-1}(d_{A(2m+1)}+a_{A(2m+1)})=0,$$

$$\sum_{m=0}^{N/2-1}(d_{B(2m)}+a_{B(2m)})=0, \sum_{m=0}^{N/2-1}(d_{B(2m+1)}+a_{B(2m+1)})=0,$$

$$\sum_{m=0}^{N/2-1}(d_{C(2m)}+a_{C(2m)})=0, \sum_{m=0}^{N/2-1}(d_{C(2m+1)}+a_{C(2m+1)})=0,$$

$$\sum_{m=0}^{N/2-1}(d_{D(2m)}+a_{D(2m)})=0, \text{ and } \sum_{m=0}^{N/2-1}(d_{D(2m+1)}+a_{D(2m+1)})=0.$$

Process 3b

If the value of $h_C$ is estimated by the data signals, pilot signals, and auxiliary signals transmitted via N samples of a reception signal (assuming that $h_C$ is constant for each sample), the sum of signals received through the N samples can be represented by the following Equation 5j:

$$\sum_{m=0}^{N/2-1}(x_{P(m)}-x_{R(m)})= \quad \text{[Equation 5j]}$$

$$h_A\left(\sum_{m=0}^{N/2-1}(d_{AP(m)}+a_{AP(m)})-\sum_{m=0}^{N/2-1}(d_{AR(m)}+a_{AR(m)})+0\right)+$$

$$h_B\left(\sum_{m=0}^{N/2-1}(d_{BP(m)}+a_{BP(m)})-\sum_{m=0}^{N/2-1}(d_{BR(m)}+a_{BR(m)})+0\right)+$$

$$h_C\left(\sum_{m=0}^{N/2-1}(d_{CP(m)}+a_{CP(m)})-\sum_{m=0}^{N/2-1}(d_{CR(m)}+a_{CR(m)})+Np\right)+h_D\left(\sum_{m=0}^{N/2-1}(d_{DP(m)}+a_{DP(m)})-\sum_{m=0}^{N/2-1}(d_{DR(m)}+a_{DR(m)})+0\right)$$

$$P(m)=\frac{-1+4m+(-1)^m}{2},$$

$$R(m)=P(m)+2$$

As can be seen from Equation 5j, pilot signals of signals transmitted via the antenna A, B, and D are added to be zero. Otherwise, pilot signals of signals transmitted via the antenna C are added to be the value of $N_p$ (assuming that noise is ignored in Equation 5j so that $$\sum_{m=0}^{N-1}v_m \simeq 0$$

is established).

In conclusion, the values of individual auxiliary signals $a_{Am}$, $a_{Bm}$, $a_{Cm}$, and $a_{Dm}$ are required to satisfy specific conditions denoted by the following conditions:

$$\sum_{m=0}^{N/2-1}(d_{AP(m)}+a_{AP(m)})=0, \sum_{m=0}^{N/2-1}(d_{AR(m)}+a_{AR(m)})=0,$$

$$\sum_{m=0}^{N/2-1}(d_{BP(m)}+a_{BP(m)})=0, \sum_{m=0}^{N/2-1}(d_{BR(m)}+a_{BR(m)})=0$$

$$\sum_{m=0}^{N/2-1}(d_{CP(m)}+a_{CP(m)})=0, \sum_{m=0}^{N/2-1}(d_{CR(m)}+a_{CR(m)})=0,$$

$$\sum_{m=0}^{N/2-1}(d_{DP(m)}+a_{DP(m)})=0, \sum_{m=0}^{N/2-1}(d_{DR(m)}+a_{DR(m)})=0$$

to calculate the value "$h_C$" using the above-mentioned process 3b.

Process 4b

If the value of $h_D$ is estimated by the data signals, pilot signals, and auxiliary signals transmitted via N samples of a reception signal (assuming that $h_D$ is constant for each sample), the sum of signals received through the N samples can be represented by the following Equation 5k:

$$\sum_{m=0}^{N/2-1}(x_{P(m)}-x_{R(m)})= \quad \text{[Equation 5k]}$$

$$h_A\left(\sum_{m=0}^{N/2-1}(d_{AP(m)}+a_{AP(m)})-\sum_{m=0}^{N/2-1}(d_{AR(m)}+a_{AR(m)})+0\right)+$$

$$h_B\left(\sum_{m=0}^{N/2-1}(d_{BP(m)}+a_{BP(m)})-\sum_{m=0}^{N/2-1}(d_{BR(m)}+a_{BR(m)})+0\right)+$$

$$h_C\left(\sum_{m=0}^{N/2-1}(d_{CP(m)}+a_{CP(m)})-\sum_{m=0}^{N/2-1}(d_{CR(m)}+a_{CR(m)})+0\right)+$$

$$h_D\left(\sum_{m=0}^{N/2-1}(d_{DP(m)}+a_{DP(m)})-\sum_{m=0}^{N/2-1}(d_{DR(m)}+a_{DR(m)})+Np\right)$$

$$P(m)=\frac{1+4m-(-1)^m}{2}, R(m)=\frac{1+4m+(-1)^m}{2}$$

As can be seen from Equation 5k, pilot signals of signals transmitted via the antenna A, B, and C are added to be zero. Otherwise, pilot signals of signals transmitted via the antenna D are added to be the value of $N_p$ (assuming that noise is ignored in Equation 5k so that $$\sum_{m=0}^{N-1}v_m \simeq 0$$

is established).

In conclusion, the values of individual auxiliary signals $a_{Am}$, $a_{Bm}$, $a_{Cm}$, and $a_{Dm}$ are required to satisfy specific conditions denoted by the following conditions:

$$\sum_{m=0}^{N/2-1}(d_{AP(m)}+a_{AP(m)})=0,\ \sum_{m=0}^{N/2-1}(d_{AR(m)}+a_{AR(m)})=0,$$

$$\sum_{m=0}^{N/2-1}(d_{BP(m)}+a_{BP(m)})=0,\ \sum_{m=0}^{N/2-1}(d_{BR(m)}+a_{BR(m)})=0$$

$$\sum_{m=0}^{N/2-1}(d_{CP(m)}+a_{CP(m)})=0,\ \sum_{m=0}^{N/2-1}(d_{CR(m)}+a_{CR(m)})=0,$$

$$\sum_{m=0}^{N/2-1}(d_{DP(m)}+a_{DP(m)})=0,\ \sum_{m=0}^{N/2-1}(d_{DR(m)}+a_{DR(m)})=0$$

to calculate the value "$h_D$" using the above-mentioned process 4b.

A method for calculating the values of the auxiliary signals $a_{Am}$, $a_{Bm}$, $a_{Cm}$, and $a_{Dm}$ using the above-mentioned processes 1b, 2b, 3b, and 4b can be generally represented by the following Equation 5l:

$$a_{A(m\bmod 4=k)}=\frac{-\sum_{m=0}^{N-1}d_{A(m\bmod 4=k)}}{N/4},$$ [Equation 5l]

$$a_{B(m\bmod 4=k)}=\frac{-\sum_{m=0}^{N-1}d_{B(m\bmod 4=k)}}{N/4},$$

$$a_{C(m\bmod 4=k)}=\frac{-\sum_{m=0}^{N-1}d_{C(m\bmod 4=k)}}{N/4},$$

$$a_{D(m\bmod 4=k)}=\frac{-\sum_{m=0}^{N-1}d_{D(m\bmod 4=k)}}{N/4},$$

$$k=0,1,2,3,$$
$$m=0,1,2,\ldots,N-1$$

If the auxiliary signals for satisfying the above-mentioned conditions are added to each other, and the sum of the auxiliary signals is transmitted via four transmission antennas, accurate channel estimation can be performed to recover the values $h_A$, $h_B$, $h_C$ and $h_D$.

Figure 18:
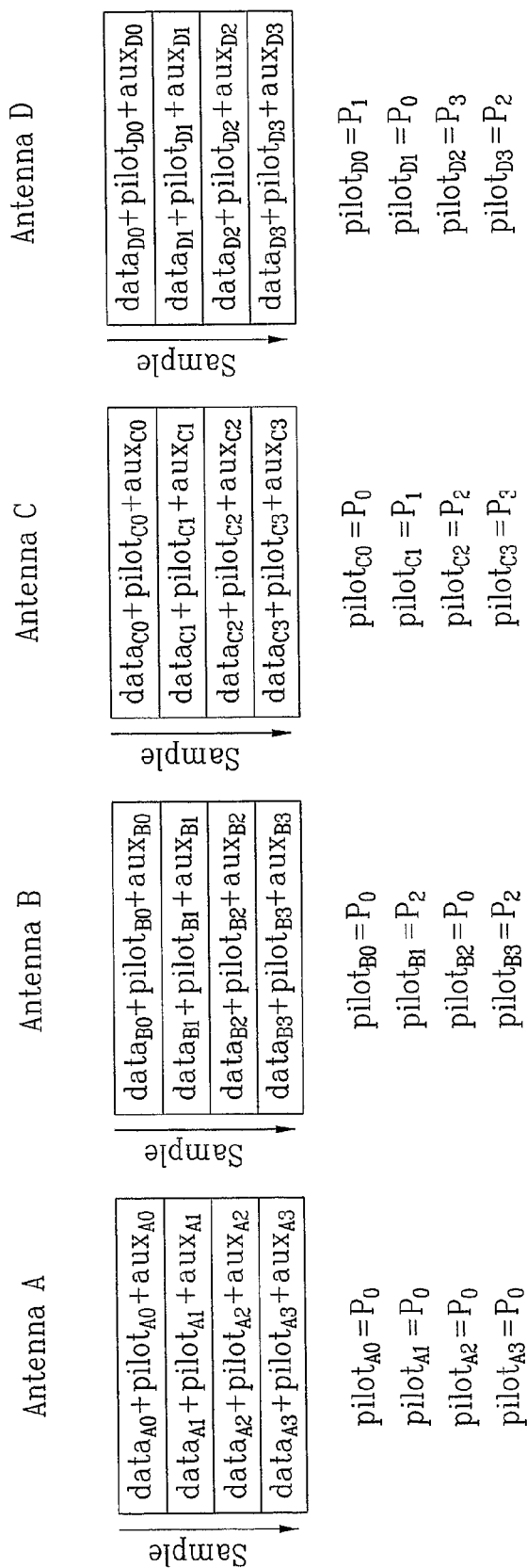
FIG. 18 is a conceptual diagram illustrating a method for modifying/arranging a pilot symbol using a QPSK orthogonal code so as to apply the second preferred embodiment to a multi-antenna system according to the present invention.

FIG. 18 is a conceptual diagram illustrating a method for modifying/arranging a pilot symbol using a QPSK orthogonal code so as to apply the second preferred embodiment to a multi-antenna system according to the present invention.

The example of FIG. 15 in the above-mentioned fourth preferred embodiment is the same as the pilot symbol mapping based on a BPSK modulation scheme. Therefore, if data is transmitted from other cells according to the QPSK scheme, BPSK pilot symbols produce interference with data symbols transmitted from other cells.

In order to solve the above-mentioned interference problem, the preferred embodiment of FIG. 18 provides a method for modifying/arranging the pilot symbols according to the QPSK scheme instead of the BPSK modulation scheme.

As mentioned above, the preferred embodiment of FIG. 18 modifies the pilot symbols using QPSK orthogonal codes, and arranges the modified pilot symbols.

The preferred embodiment of FIG. 18 provides a method for additionally including the auxiliary signal (aux) capable of allowing the sum of data signals contained in N samples to converge at zero.

The above-mentioned pilot arrangement has previously been disclosed in the above-mentioned fourth preferred embodiment of FIG. 16, such that a method for calculating the auxiliary signal (aux) will hereinafter be described in detail.

If the number of transmission antennas is $N_t$, a method for calculating the auxiliary signal (aux) according to the number of transmission antenna $N_t$ is as follows.

The exemplary case of $N_t=1$ is the same as the above-mentioned second preferred embodiment.

Provided that the auxiliary signal is a specific constant "a", a reception signal of a receiver can be represented by the following Equation 5m:

$$x_m=h(d_m+p_m+a)+v_m\ m=0,1,2,\ldots,N-1$$ [Equation 5m]

In this case, the value "a" for allowing the sum of the data and auxiliary signals contained in N samples to be zero can be calculated by the following Equation 5n:

$$\sum_{m=0}^{N-1}(d_m+a)=0\Leftrightarrow a=\frac{-\sum_{m=0}^{N-1}d_m}{N}$$ [Equation 5n]

The Equations 5m~5n are equal to the above-mentioned Equations 2a~2b.

Under the situation of $N_t=2$, the auxiliary signal can be calculated by the following method.

Under the situation of two transmission antennas (i.e., antennas A and B), a reception signal of the receiver can be represented by the following Equation 5o:

$$x_m=h_A(d_{Am}+p_{Am}+a_{Am})+h_B(d_{Bm}+p_{Bm}+a_{Bm})+v_m\ m=0,1,$$
$$2,\ldots,N-1$$ [Equation 5o]

In this case, auxiliary signal values $a_{Am}$ and $a_{Bm}$ for adding N data symbols and N auxiliary signals (where N=the number of all samples to be transmitted) to acquire the sum of zero can be calculated by the following processes 1c and 2c.

Process 1c

If the value of $h_A$ is estimated by the data signals, auxiliary signals, and pilot signals transmitted via N samples of a reception signal (assuming that $h_A$ is constant for each sub-carrier), the sum of signals received via N subcarriers can be represented by the following Equation 5p:

$$\sum_{m=0}^{N-1}P_0^*x_m=h_A\left(P_0^*\sum_{m=0}^{N-1}d_{Am}+N+P_0^*\sum_{m=0}^{N-1}a_{Am}\right)+$$ [Equation 5p]
$$h_B\left(P_0^*\sum_{m=0}^{N-1}d_{Bm}+0+P_0^*\sum_{m=0}^{N-1}a_{Bm}\right)$$

As can be seen from Equation 5p, pilot signals of signals transmitted via the antenna A are added to be $$P_0^*\sum_{m=0}^{N-1}p_{Am}=N$$

without converging at zero. Otherwise, pilot signals of signals transmitted via the antenna B are added to be $$P_0^* \sum_{m=0}^{N-1} p_{Bm} = 0,$$

however, it should be noted that noise is ignored in Equation 5d to establish $$P_0^* \sum_{m=0}^{N-1} p_{Bm} = 0.$$

In conclusion, in order to calculate the value "$h_A$" using the above-mentioned process 1c, the values of individual auxiliary signals $a_{Am}$ and $a_{Bm}$ are required to satisfy $$\sum_{m=0}^{N-1} d_{Am} + \sum_{m=0}^{N-1} a_{Am} = 0,$$

and $$\sum_{m=0}^{N-1} d_{Bm} + \sum_{m=0}^{N-1} a_{Bm} = 0.$$

Process 2c

If the value of $h_B$ is estimated by data symbols transmitted via N subcarriers of a reception signal (assuming that $h_B$ is constant for each subcarrier), the sum of signals received through the N samples can be represented by the following Equation 5q:

$$\sum_{m=0}^{N/2-1} (P_0^* x_{2m} + P_2^* x_{2m+1}) = h_A \left( P_0^* \sum_{m=0}^{N/2-1} (d_{A(2m)} + a_{A(2m)}) + P_2^* \sum_{m=0}^{N/2-1} (d_{A(2m+1)} + a_{A(2m+1)}) + 0 \right) + h_B \left( P_0^* \sum_{m=0}^{N/2-1} (d_{B(2m)} + a_{B(2m)}) + P_2^* \sum_{m=0}^{N/2-1} (d_{B(2m+1)} + a_{B(2m+1)}) + N \right)$$
[Equation 5q]

As can be seen from Equation 5q, pilot signals of signals transmitted via the antenna A are added to be zero. Otherwise, pilot signals of signals transmitted via the antenna B are added to be the value of N.

In conclusion, in order to calculate the value "$h_B$" using the above-mentioned process 2c, the values of individual auxiliary signals a, and $a_{Bm}$ are required to satisfy specific conditions denoted by $$\sum_{m=0}^{N/2-1} (d_{A(2m)} + a_{A(2m)}) = 0, \sum_{m=0}^{N/2-1} (d_{A(2m+1)} + a_{A(2m+1)}) = 0,$$

$$\sum_{m=0}^{N/2-1} (d_{B(2m)} + a_{B(2m)}) = 0, \text{ and } \sum_{m=0}^{N/2-1} (d_{B(2m+1)} + a_{B(2m+1)}) = 0.$$

A method for calculating the values of the auxiliary signals $a_{Am}$ and $a_{Bm}$ using the above-mentioned processes 1c and 2c can be generally represented by the following Equation 5r:

$$a_{A(2m)} = \frac{-\sum_{m=0}^{N/2-1} d_{A(2m)}}{N/2},$$

$$a_{A(2m+1)} = \frac{-\sum_{m=0}^{N/2-1} d_{A(2m+1)}}{N/2},$$

$$a_{B(2m)} = \frac{-\sum_{m=0}^{N/2-1} d_{B(2m)}}{N/2},$$

$$a_{B(2m+1)} = \frac{-\sum_{m=0}^{N/2-1} d_{B(2m+1)}}{N/2},$$

$$m = 0, 1, 2, \ldots N/2 - 1$$
[Equation 5r]

If the auxiliary signals for satisfying the above-mentioned conditions are added to each other, and the sum of the auxiliary signals is transmitted via two transmission antennas, accurate channel estimation can be performed to recover the values $h_A$ and $h_B$.

An exemplary case of $N_t=4$ calculates the auxiliary signals using the following method.

If four transmission antennas (i.e., antennas A, B, C, and D) are used, signals received in the receiver can be represented by the following Equation 5s:

$$x_m = h_A(d_{Am} + p_{Am} + a_{Am}) + h_B(d_{Bm} + p_{Bm} + a_{Bm}) + h_C(d_{Cm} + p_{Cm} + a_{Cm}) + h_D(d_{Dm} + p_{Dm} + a_{Dm}) + v_m, \quad m=0,1, 2,\ldots,N-1$$
[Equation 5s]

In this case, auxiliary signal values $a_{Am}$, $a_{Bm}$, $a_{Cm}$ and $a_{Dm}$ for adding N data signals and N auxiliary signals (where N means the number of all samples to be transmitted) to acquire the sum of zero can be calculated by the following processes 1d~4d.

Process 1d

If the value of $h_A$ is estimated by pilot and auxiliary signals contained in N samples of a reception signal (assuming that $h_A$ is constant for each subcarrier), the data signal, signals received via the N samples are added as denoted by the following Equation 5t:

$$\sum_{m=0}^{N-1} P_0^* x_m = h_A \left( P_0^* \sum_{m=0}^{N-1} d_{Am} + N + P_0^* \sum_{m=0}^{N-1} a_{Am} \right) + h_B \left( P_0^* \sum_{m=0}^{N-1} d_{Bm} + 0 + P_0^* \sum_{m=0}^{N-1} a_{Bm} \right) + h_C \left( P_0^* \sum_{m=0}^{N-1} d_{Cm} + 0 + P_0^* \sum_{m=0}^{N-1} a_{Cm} \right) + h_D \left( P_0^* \sum_{m=0}^{N-1} d_{Dm} + 0 + P_0^* \sum_{m=0}^{N-1} a_{Dm} \right)$$
[Equation 5t]

As can be seen from Equation 5t, pilot signals of signals transmitted via the antenna A are added to be $$P_0^* \sum_{m=0}^{N-1} p_{Am} = N$$

without converging at zero. Otherwise, pilot signals of signals transmitted via the antennas B, C, and D are added to be $$P_0^* \sum_{m=0}^{N-1} p_{Bm} = P_0^* \sum_{m=0}^{N-1} p_{Cm}$$
$$= P_0^* \sum_{m=0}^{N-1} p_{Dm}$$
$$= 0,$$

however, it should be noted that noise is ignored in Equation 5t to establish $$P_0^* \sum_{m=0}^{N-1} p_{Am} = N.$$

In conclusion, in order to calculate the value "$h_A$" using the above-mentioned process 1d, the values of individual auxiliary signals $a_{Am}$ and $a_{Bm}$ are required to satisfy $$\sum_{m=0}^{N-1} d_{Am} + \sum_{m=0}^{N-1} a_{Am} = 0, \sum_{m=0}^{N-1} d_{Bm} + \sum_{m=0}^{N-1} a_{Bm} = 0,$$
$$\sum_{m=0}^{N-1} d_{Cm} + \sum_{m=0}^{N-1} a_{Cm} = 0, \text{ and } \sum_{m=0}^{N-1} d_{Dm} + \sum_{m=0}^{N-1} a_{Dm} = 0.$$

Process 2d

If the value of $h_B$ is estimated by data symbols transmitted via N samples of a reception signal (assuming that $h_B$ is constant for each subcarrier), the sum of signals received via the N samples can be represented by the following Equation 5u:

$$\sum_{m=0}^{N/2-1} (P_0^* x_{2m} + P_2^* x_{2m+1}) = \qquad \text{[Equation 5u]}$$
$$h_A \left( P_0^* \sum_{m=0}^{N/2-1} (d_{A(2m)} + a_{A(2m)}) + \right.$$
$$\left. P_2^* \sum_{m=0}^{N/2-1} (d_{A(2m+1)} + a_{A(2m+1)}) + 0 \right) +$$
$$h_B \left( P_0^* \sum_{m=0}^{N/2-1} (d_{B(2m)} + a_{B(2m)}) + \right.$$
$$\left. P_2^* \sum_{m=0}^{N/2-1} (d_{B(2m+1)} + a_{B(2m+1)}) + N \right) +$$

-continued
$$h_C \left( P_0^* \sum_{m=0}^{N/2-1} (d_{C(2m)} + a_{C(2m)}) + \right.$$
$$\left. P_2^* \sum_{m=0}^{N/2-1} (d_{C(2m+1)} + a_{C(2m+1)}) + 0 \right) +$$
$$h_D \left( P_0^* \sum_{m=0}^{N/2-1} (d_{D(2m)} + a_{D(2m)}) + \right.$$
$$\left. P_2^* \sum_{m=0}^{N/2-1} (d_{D(2m+1)} + a_{D(2m+1)}) + 0 \right)$$

As can be seen from Equation 5u, pilot signals of signals transmitted via the antenna A, C, and D are added to be zero. Otherwise, pilot signals of signals transmitted via the antenna B are added to be the value of N.

In conclusion, in order to calculate the value "$h_B$" using the above-mentioned process 2d, the values of individual auxiliary signals $a_{Am}$, $a_{Bm}$, $a_{Cm}$, and $a_{Dm}$ are required to satisfy specific conditions denoted by $$\sum_{m=0}^{N/2-1} (d_{A(2m)} + a_{A(2m)}) = 0, \sum_{m=0}^{N/2-1} (d_{A(2m+1)} + a_{A(2m+1)}) = 0,$$
$$\sum_{m=0}^{N/2-1} (d_{B(2m)} + a_{B(2m)}) = 0, \sum_{m=0}^{N/2-1} (d_{B(2m+1)} + a_{B(2m+1)}) = 0,$$
$$\sum_{m=0}^{N/2-1} (d_{C(2m)} + a_{C(2m)}) = 0, \sum_{m=0}^{N/2-1} (d_{C(2m+1)} + a_{C(2m+1)}) = 0,$$
$$\sum_{m=0}^{N/2-1} (d_{D(2m)} + a_{D(2m)}) = 0, \text{ and } \sum_{m=0}^{N/2-1} (d_{D(2m+1)} + a_{D(2m+1)}) = 0.$$

Process 3d

If the value of $h_C$ is estimated by the data-, pilot-, and auxiliary-signals transmitted via N samples of a reception signal (assuming that $h_C$ is constant for each sample), the sum of signals received through the N samples can be represented by the following Equation 5v:

$$\sum_{m=0}^{N-1} P_{(m \bmod 4)}^* x_m = h_A \left( \sum_{m=0}^{N-1} P_{(m \bmod 4)}^* (d_{Am} + a_{Am}) + 0 \right) + \qquad \text{[Equation 5v]}$$
$$h_B \left( \sum_{m=0}^{N-1} P_{(m \bmod 4)}^* (d_{Bm} + a_{Bm}) + 0 \right) +$$
$$h_C \left( \sum_{m=0}^{N-1} P_{(m \bmod 4)}^* (d_{Cm} + a_{Cm}) + N \right) +$$
$$h_D \left( \sum_{m=0}^{N-1} P_{(m \bmod 4)}^* (d_{Dm} + a_{Dm}) + 0 \right)$$

As can be seen from Equation 5v, pilot signals of signals transmitted via the antenna A, B, and D are added to be zero. Otherwise, pilot signals of signals transmitted via the antenna C are added to be the value of N.

In conclusion, the values of individual auxiliary signals $a_{Am}$, $a_{Bm}$, $a_{Cm}$, and $a_{Dm}$ are required to satisfy specific conditions denoted by the following conditions $$\sum_{m=0}^{N-1} P_{(m \bmod 4)}(d_{Am} + a_{Am}) = 0, \sum_{m=0}^{N-1} P_{(m \bmod 4)}(d_{Bm} + a_{Bm}) = 0,$$

$$\sum_{m=0}^{N-1} P_{(m \bmod 4)}(d_{Cm} + a_{Cm}) = 0, \text{ and } \sum_{m=0}^{N-1} P_{(m \bmod 4)}(d_{Dm} + a_{Dm}) = 0$$

to calculate the value "$h_C$" using the above-mentioned process $3d$.

Process $4d$

If the value of $h_D$ is estimated by the data-, pilot-, and auxiliary-signals transmitted via N samples of a reception signal (assuming that $h_D$ is constant for each sample), the sum of signals received through the N samples can be represented by the following Equation 5w:

$$\sum_{m=0}^{N/2-1} (P^*_{((2m+1) \bmod 4)} x_{2m} + P^*_{(2m \bmod 4)} x_{2m+1}) = \quad \text{[Equation 5w]}$$

$$h_A \left( \sum_{m=0}^{N/2-1} P^*_{((2m+1) \bmod 4)}(d_{A2m} + a_{A2m}) + \sum_{m=0}^{N/2-1} P^*_{(2m \bmod 4)}(d_{A(2m+1)} + a_{A(2m+1)}) + 0 \right) +$$

$$h_B \left( \sum_{m=0}^{N/2-1} P^*_{((2m+1) \bmod 4)}(d_{B2m} + a_{B2m}) + \sum_{m=0}^{N/2-1} P^*_{(2m \bmod 4)}(d_{B(2m+1)} + a_{B(2m+1)}) + 0 \right) +$$

$$h_C \left( \sum_{m=0}^{N/2-1} P^*_{((2m+1) \bmod 4)}(d_{C2m} + a_{C2m}) + \sum_{m=0}^{N/2-1} P^*_{(2m \bmod 4)}(d_{C(2m+1)} + a_{C(2m+1)}) + 0 \right) +$$

$$h_D \left( \sum_{m=0}^{N/2-1} P^*_{((2m+1) \bmod 4)}(d_{D2m} + a_{D2m}) + \sum_{m=0}^{N/2-1} P^*_{(2m \bmod 4)}(d_{D(2m+1)} + a_{D(2m+1)}) + N \right)$$

As can be seen from Equation 5w, pilot signals of signals transmitted via the antenna A, B, and C are added to be zero. Otherwise, pilot signals of signals transmitted via the antenna D are added to be the value of N.

In conclusion, the values of individual auxiliary signals $a_{Am}$, $a_{Bm}$, $a_{Cm}$, and $a_{Dm}$ are required to satisfy specific conditions denoted by the following conditions, $$\sum_{m=0}^{N/2-1} P_{((2m+1) \bmod 4)}(d_{A2m} + a_{A2m}) = 0,$$

$$\sum_{m=0}^{N/2-1} P_{(2m \bmod 4)}(d_{A(2m+1)} + a_{A(2m+1)}) = 0,$$

$$\sum_{m=0}^{N/2-1} P_{((2m+1) \bmod 4)}(d_{B2m} + a_{B2m}) = 0,$$

-continued $$\sum_{m=0}^{N/2-1} P_{(2m \bmod 4)}(d_{B(2m+1)} + a_{B(2m+1)}) = 0,$$

$$\sum_{m=0}^{N/2-1} P_{((2m+1) \bmod 4)}(d_{C2m} + a_{C2m}) = 0,$$

$$\sum_{m=0}^{N/2-1} P_{(2m \bmod 4)}(d_{C(2m+1)} + a_{C(2m+1)}) = 0,$$

$$\sum_{m=0}^{N/2-1} P_{((2m+1) \bmod 4)}(d_{D2m} + a_{D2m}) = 0, \text{ and}$$

$$\sum_{m=0}^{N/2-1} P_{(2m \bmod 4)}(d_{D(2m+1)} + a_{D(2m+1)}) = 0$$

to calculate the value "$h_D$" using the above-mentioned process $4d$.

A method for calculating the values of the auxiliary signals $a_{Am}$, $a_{Bm}$, $a_{Cm}$, and $a_{Dm}$ using the above-mentioned processes $1d$, $2d$, $3d$, and $4d$ can be generally represented by the following Equation 5x:

$$a_{A(m \bmod 4=k)} = \frac{-\sum_{m=0}^{N-1} d_{A(m \bmod 4=k)}}{N/4}, \quad \text{[Equation 5x]}$$

$$a_{B(m \bmod 4=k)} = \frac{-\sum_{m=0}^{N-1} d_{B(m \bmod 4=k)}}{N/4},$$

$$a_{C(m \bmod 4=k)} = \frac{-\sum_{m=0}^{N-1} d_{C(m \bmod 4=k)}}{N/4},$$

$$a_{D(m \bmod 4=k)} = \frac{-\sum_{m=0}^{N-1} d_{D(m \bmod 4=k)}}{N/4},$$

$$k = 0, 1, 2, 3,$$

$$m = 0, 1, 2, \ldots N/2 - 1$$

If the auxiliary signals for satisfying the above-mentioned conditions are added to each other, and the sum of the auxiliary signals is transmitted via four transmission antennas, accurate channel estimation can be performed to recover the values $h_A$, $h_B$, $h_C$ and $h_D$.

Sixth Preferred Embodiment

A sixth preferred embodiment of the present invention provides a method for applying a disjointed pilot signal to each antenna without containing the pilot signal in all samples.

Figure 19:
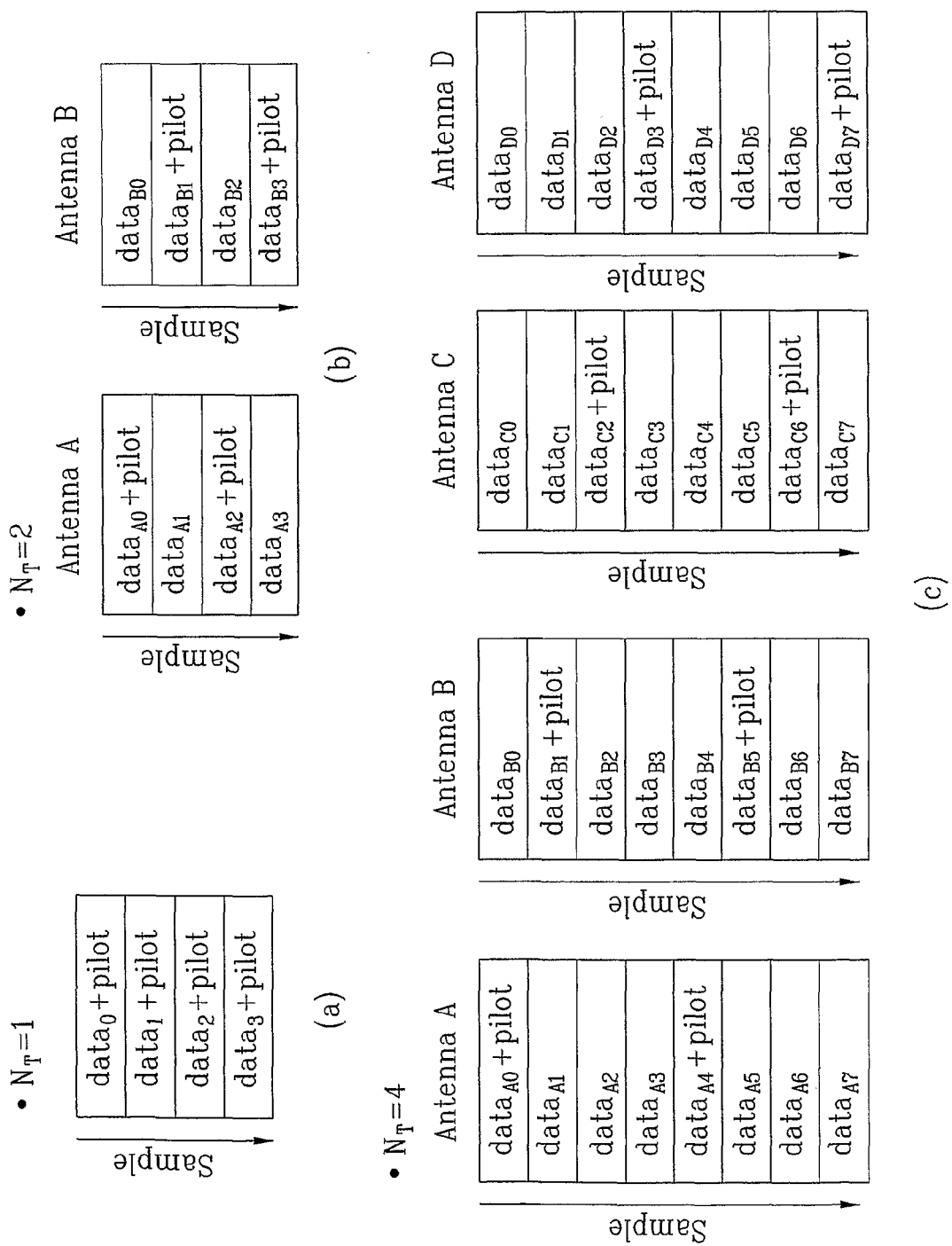
FIG. 19 is a conceptual diagram illustrating a method for creating a disjointed pilot signal according to a sixth preferred embodiment of the present invention.

FIG. 19 is a conceptual diagram illustrating a method for creating a disjointed pilot signal according to a sixth preferred embodiment of the present invention.

The above-mentioned disjointed pilot signal is a pilot signal applied to only one of several samples transmitted to the plurality of antennas using the same frequency-time resources.

Also, if a pilot signal is applied to a sample transmitted to a specific antenna, the disjointed pilot signal may be applied to the sample transmitted to the specific antenna after all the pilot signals have been applied to samples transmitted to the remaining antennas.

The disjointed pilot signal will hereinafter be described with reference to FIG. 19.

FIG. 19(a) is a method for creating the disjointed pilot signal via a single antenna. An example of FIG. 19(a) is the same as the above-mentioned first preferred embodiment.

FIG. 19(b) is a method for creating the disjointed pilot signal via two antennas (Antennas A and B).

Referring to FIG. 19(b), $data_{A0}$ is transmitted via the antenna A, $data_{B0}$ is transmitted via the antenna B, and $data_{A0}$ and $data_{B0}$ are transmitted via the same frequency-time resources.

For example, the OFDM/OFDMA system transmits the above-mentioned data ($data_{A0}$ and $data_{B0}$) using the same frequency resource. The TDM/TDMA system transmits the above-mentioned data ($data_{A0}$ and $data_{B0}$) via the same timeslot. The CDM/CDMA system transmits the above-mentioned data ($data_{A0}$ and $data_{B0}$) via the same code. The FDM/FDMA system transmits the above-mentioned data ($data_{A0}$ and $data_{B0}$) via the same frequency band.

In conclusion, the above-mentioned data ($data_{A0}$ and $data_{B0}$) receives the same frequency-time resources, such that the pilot signal is applied to any one of the above-mentioned data ($data_{A0}$ and $data_{B0}$).

In addition, the above-mentioned data ($data_{A1}$ and $data_{B1}$) is transmitted via the same frequency-time resources, and the pilot signal is applied to any one of the above-mentioned data ($data_{A1}$ and $data_{B1}$).

However, the pilot signal has previously been transmitted to the sample $data_{A0}$ transmitted via the antenna A, such that the pilot signal is applied to the sample $data_{B1}$ transmitted via the antenna B Therefore, the pilot signal can be applied to only one (i.e., $data_{B1}$) of the above-mentioned data ($data_{A1}$ and $data_{B1}$).

FIG. 19(c) is a method for creating the disjointed pilot signal via four antennas (Antennas A, B, C, and D).

Referring to FIG. 19(c), $data_{A0}$ is transmitted via the antenna A, $data_{B0}$ is transmitted via the antenna B, $data_{C0}$ is transmitted via the antenna C, $data_{D0}$ is transmitted via the antenna D, and $data_{A0}$, $data_{B0}$, $data_{C0}$, and $data_{D0}$ are transmitted via the same frequency-time resources.

For example, the OFDM/OFDMA system transmits the above-mentioned data ($data_{A0}$, $data_{B0}$, $data_{C0}$, and $data_{D0}$) via the same subcarrier. The TDM/TDMA system transmits the above-mentioned data ($data_{A0}$, $data_{B0}$, $data_{C0}$, and $data_{D0}$) via the same timeslot. The CDM/CDMA system transmits the above-mentioned data ($data_{A0}$, $data_{B0}$, $data_{C0}$, and $data_{D0}$) via the same code. The FDM/FDMA system transmits the above-mentioned data ($data_{A0}$, $data_{B0}$, $data_{C0}$, and $data_{D0}$) via the same frequency band.

In conclusion, the above-mentioned data ($data_{A0}$, $data_{B0}$, $data_{C0}$, and $data_{D0}$) receives the same frequency-time resources, such that the pilot signal is applied to any one of the above-mentioned data ($data_{A0}$, $data_{B0}$, $data_{C0}$ and $data_{D0}$).

In addition, the above-mentioned data ($data_{A1}$, $data_{B1}$, $data_{C1}$, and $data_{D1}$) is transmitted via the same frequency-time resources, and the pilot signal is applied to any one of the above-mentioned data ($data_{A1}$, $data_{B1}$, $data_{C1}$, and $data_{D1}$).

However, the pilot signal has previously been transmitted to the sample $data_{A0}$ transmitted via the antenna A, such that the pilot signal is applied to the sample transmitted via the antenna A after having been transmitted to the other sample transmitted via the antennas B, C, and D.

Therefore, the pilot signal may be applied to the sample $data_{B1}$ transmitted via the antenna B from among the antennas B, C, and D.

If the pilot signal is applied to the sample $data_{B1}$, the pilot signal has already been transmitted to the samples $data_{A0}$ and $data_{B1}$ transmitted via the antennas A and B, such that the pilot signal is applied to other samples transmitted via the antennas C and D.

Therefore, the pilot signal may be applied to the sample $data_{C2}$ transmitted via the antenna C from among the antennas C and D.

If the pilot signal is applied to the sample $data_{C1}$, the pilot signal has already been transmitted to the samples $data_{A0}$, $data_{B1}$, and $data_{C2}$ transmitted via the antennas A, B, and C, such that the pilot signal is applied to the sample $data_{D3}$ transmitted via the antenna D.

Although the example of FIG. 19(c) shows the disjointed pilot signals transmitted in the order of the antennas A, B, C, and D, it should be noted that there is no limitation in the order of the pilot signal transmission, such that the above-mentioned disjointed pilot signal may be applied in various orders as necessary.

Differently from the first to fifth preferred embodiments, the above-mentioned sixth preferred embodiment of the present invention need not include the pilot signal in all the samples transmitted via all the antennas.

In other words, the above-mentioned sixth preferred embodiment of the present invention provides the disjointed pilot signal unequipped with the pilot signal to all the samples, such that pilot signals of individual antennas do not overlap with each other.

Preferably, in order to allow the above-mentioned sixth preferred embodiment to have the same effect as the above-mentioned first preferred embodiment where the pilot signal is contained in all the samples transmitted via all the antennas, the pilot signals must be boosted according to the number of the antennas.

If the disjointed pilot signal is applied via two antennas, the signals are boosted by two times. If the disjointed pilot signal is applied via four antennas, the signals are boosted by four times.

If signals are transmitted in the above-mentioned sixth preferred embodiment, the channel estimation is calculated by the sum of samples (e.g., $data_{A0}$+pilot, $data_{B0}$, $data_{C0}$, and $data_{D0}$) transmitted via several antennas (i.e., the same frequency-time resources).

Seventh Preferred Embodiment

A seventh preferred embodiment of the present invention provides a method for applying a disjointed pilot signal to each antenna without including the pilot signal in all samples, and additionally including an auxiliary signal in the pilot signal.

Figure 20:
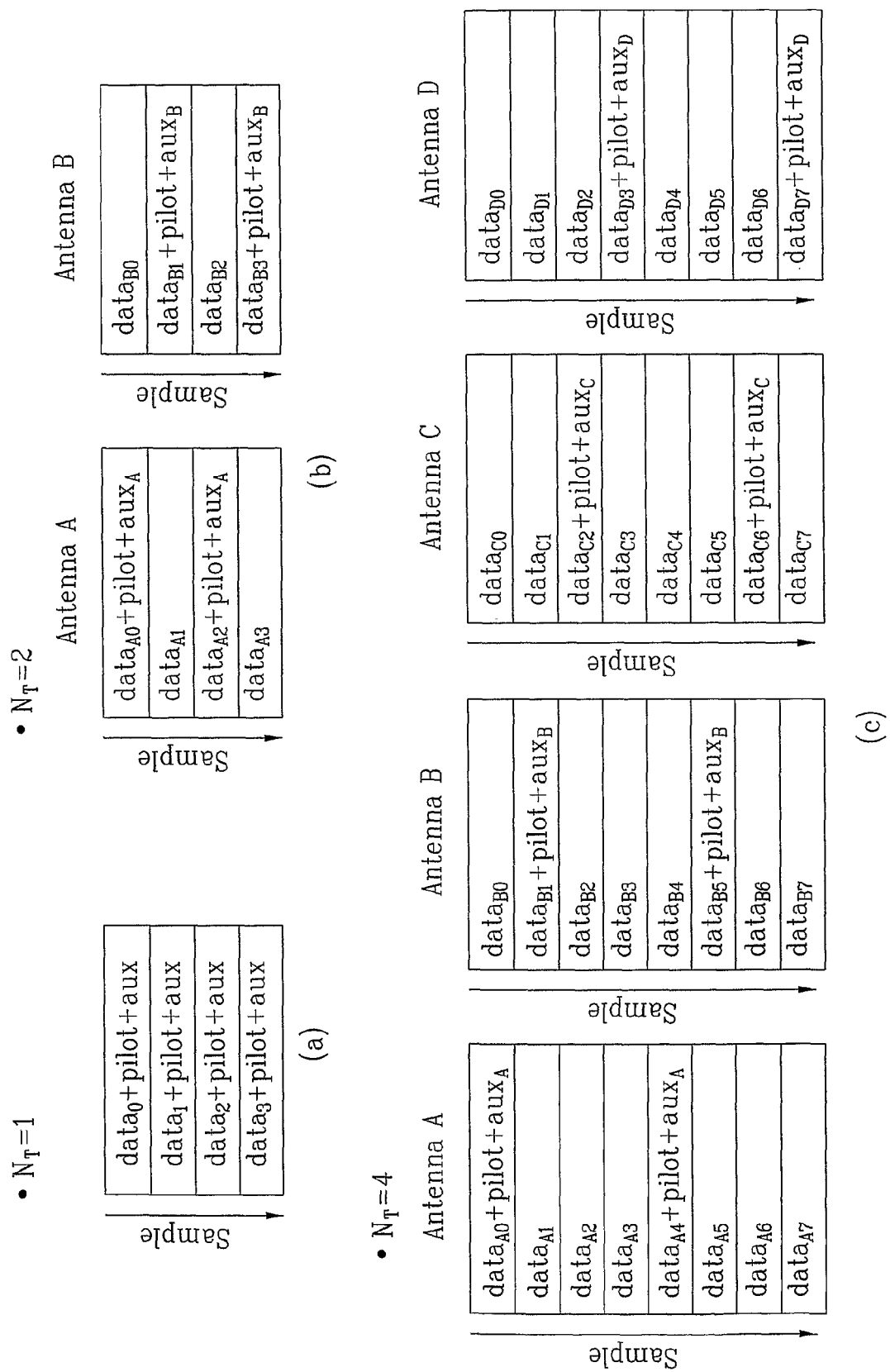
FIG. 20 is a conceptual diagram illustrating a method for inserting an auxiliary signal in a disjointed pilot signal to configure necessary samples according to a seventh preferred embodiment of the present invention.

FIG. 20 is a conceptual diagram illustrating a method for inserting an auxiliary signal in a disjointed pilot signal to configure necessary samples according to a seventh preferred embodiment of the present invention.

As described above, the above-mentioned disjointed pilot signal is a pilot signal applied to only one of several samples transmitted to the plurality of antennas using the same frequency-time resources.

Also, if a pilot signal is applied to a sample transmitted to a specific antenna, the disjointed pilot signal may be applied to the sample transmitted to the specific antenna after all the pilot signals have been applied to samples transmitted to the remaining antennas.

According to the seventh preferred embodiment, the added auxiliary signal is contained in data signals transmitted via a specific antenna, such that it can set the sum of the data signals to zero.

The above-mentioned seventh preferred embodiment provides a method for including the auxiliary signal in the sample equipped with the disjointed pilot signal of the sixth preferred embodiment without including the pilot and auxiliary signals in all the samples, whereas the second preferred embodiment of the present invention provides a method for including the pilot and auxiliary signals in all the samples.

As previously stated in the second preferred embodiment, information indicating the auxiliary signal may be separately transmitted from the transmission end. However, this situation may unavoidably increase system overhead, such that the information indicating the auxiliary signal may not be separately transmitted.

In this case, the reception end does not recognize information of the auxiliary signal, such that the above-mentioned auxiliary signal may act as noise.

If the auxiliary signal is contained in all the samples transmitted via the transmission antennas, the auxiliary signal contained in the sample transmitted via a specific antenna may create interference upon the sample transmitted via the remaining antennas.

The seventh preferred embodiment of the present invention applies the auxiliary signal to only a specific sample without applying the auxiliary signal to all the samples, such that it prevents the auxiliary signals associated with individual antennas from overlapping with each other, resulting in reduction of interference between antennas.

The above-mentioned auxiliary signal contained in the disjointed pilot signal will hereinafter be described with reference to FIG. 20.

FIG. 20(a) is a method for creating the disjointed pilot signal via a single antenna. An example of FIG. 20(a) is the same as the above-mentioned second preferred embodiment.

The auxiliary signal (aux) shown in FIG. 20(a) can be represented by the following Equation 6a:

$$aux = \frac{-\sum_{m=0}^{N-1} data_{(m)}}{N} \quad \text{[Equation 6a]}$$

Where "m" is indicative of index information for the distinction of individual samples. If the auxiliary signal (aux) is implemented as denoted by Equation 6a, the sum of the data and auxiliary signals contained in N samples transmitted via specific data is to be zero.

Also, as previously stated in the above-mentioned second preferred embodiment, the sum of data and auxiliary signals is to be zero, such that the reception end can perform correct modulation.

FIG. 20(b) exemplary shows a method for applying the disjointed auxiliary signal to two antennas (Antennas A and B).

According to the method for creating the disjointed pilot signal shown in the sixth preferred embodiment, in the case of samples transmitted to the antenna A, the pilot signal is applied to samples $data_{A0}$ and $data_{A2}$ from among all the samples transmitted to the antenna A. In the case of samples transmitted to the antenna B, the pilot signal is applied to samples $data_{B1}$ and $data_{B3}$ from among all the samples transmitted to the antenna B. Therefore, the auxiliary signal $aux_A$ for the samples transmitted via the antenna A is applied to the above-mentioned samples $data_{A0}$ and $data_{A2}$, and the auxiliary signal $aux_B$ for the samples transmitted via the antenna B is applied to the above-mentioned samples $data_{B1}$ and $data_{B3}$.

The auxiliary signal $aux_A$ for the samples transmitted via the antenna A is an auxiliary signal for allowing the sum of data and auxiliary signals transmitted to the antenna A to be zero. The auxiliary signal $aux_B$ for the samples transmitted via the antenna B is an auxiliary signal for allowing the sum of data and auxiliary signals transmitted to the antenna B to be zero.

The above-mentioned auxiliary signals $aux_A$ and $aux_B$ can be represented by the following Equation 6b:

$$aux_A = \frac{-\sum_{m=0}^{N/2-1}(data_{A(2m)} + data_{B(2m)})}{N/2} \quad \text{[Equation 6b]}$$

$$aux_B = \frac{-\sum_{m=0}^{N/2-1}(data_{A(2m+1)} + data_{B(2m+1)})}{N/2}$$

FIG. 20(c) exemplary shows a method for applying the disjointed auxiliary signal to four antennas (Antennas A, B, C, and D).

According to the method for creating the disjointed pilot signal shown in the sixth preferred embodiment, in the case of samples transmitted via the antenna A, the pilot signal is applied to samples $data_{A0}$ and $data_{A4}$ from among all the samples transmitted via the antenna A. In the case of samples transmitted via the antenna B, the pilot signal is applied to samples $data_{B1}$ and $data_{B5}$ from among all the samples transmitted via the antenna B. In the case of samples transmitted to the antenna C, the pilot signal is applied to samples $data_{C2}$ and $data_{C6}$ from among all the samples transmitted via the antenna C. In the case of samples transmitted via the antenna B, the pilot signal is applied to samples $data_{D3}$ and $data_{A7}$ from among all the samples transmitted via the antenna D.

Therefore, the auxiliary signal $aux_A$ for the samples transmitted via the antenna A is applied to the above-mentioned samples $data_{A0}$ and $data_{A4}$, and the auxiliary signal $aux_B$ for the samples transmitted via the antenna B is applied to the above-mentioned samples $data_{B1}$ and $data_{B5}$. The auxiliary signal $aux_C$ for the samples transmitted to via the antenna C is applied to the above-mentioned samples $data_{C2}$ and $data_{C6}$, and the auxiliary signal $aux_D$ for the samples transmitted via the antenna D is applied to the above-mentioned samples $data_{D3}$ and $data_{D7}$.

The auxiliary signal $aux_A$ for the samples transmitted via the antenna A is indicative of an auxiliary signal for allowing the sum of data and auxiliary signals transmitted via the antenna A to be zero. The auxiliary signal $aux_B$ for the samples transmitted via the antenna B is indicative of an auxiliary signal for allowing the sum of data and auxiliary signals transmitted to the antenna B to be zero.

The auxiliary signal $aux_C$ for the samples transmitted via the antenna C is an auxiliary signal for allowing the sum of data and auxiliary signals transmitted via the antenna C to be zero. The auxiliary signal $aux_D$ for the samples transmitted via the antenna D is an auxiliary signal for allowing the sum of data and auxiliary signals transmitted via the antenna D to be zero.

The above-mentioned auxiliary signals $aux_A$, $aux_B$, $aux_C$, and $aux_D$ can be represented by the following Equation 6c:

$$aux_A = \frac{-\sum_{m=0}^{N/4-1}(data_{A(4m)} + data_{B(4m)} + data_{C(4m)} + data_{D(4m)})}{N/4},$$ [Equation 6c]

$$aux_B = \frac{-\sum_{m=0}^{N/4-1}(data_{A(4m+1)} + data_{B(4m+1)} + data_{C(4m+1)} + data_{D(4m+1)})}{N/4},$$

$$aux_C = \frac{-\sum_{m=0}^{N/4-1}(data_{A(4m+2)} + data_{B(4m+2)} + data_{C(4m+2)} + data_{D(4m+2)})}{N/4},$$

$$aux_D = \frac{-\sum_{m=0}^{N/4-1}(data_{A(4m+3)} + data_{B(4m+3)} + data_{C(4m+3)} + data_{D(4m+3)})}{N/4},$$

Differently from the first to fifth preferred embodiments, the above-mentioned seventh preferred embodiment of the present invention need not include the pilot signal in all the samples transmitted via all the antennas.

In other words, the above-mentioned seventh preferred embodiment of the present invention provides the disjointed pilot signal, such that pilot signals of individual antennas do not overlap with each other.

If the reception end receives signals from four transmission antennas on the condition that the transmission end does not separately transmit information for the auxiliary signal, the channel estimation is executed by four specific samples (e.g., $data_{A0}$+pilot+$aux_A$, $data_{B0}$, $data_{C0}$, and $data_{D0}$), such that the data recovery is implemented. In more detail, only a single auxiliary signal is contained in four samples, such that the data recovery is implemented without generating interference between antennas.

In order to allow the above-mentioned seventh preferred embodiment to acquire the same effect the second preferred embodiment where the pilot signals are contained in all the samples transmitted via all antennas, the pilot signals must be boosted according to the number of the antennas.

If the disjointed pilot signal is applied via two antennas, the signals are boosted by two times. If the disjointed pilot signal is applied via four antennas, the signals can be boosted by four times.

If signals are transmitted in the above-mentioned seventh preferred embodiment, the channel estimation is calculated by the sum of samples (e.g., $data_{A0}$+pilot+aux, $data_{B0}$, $data_{C0}$, and $data_{D0}$) transmitted via several antennas (i.e., the same frequency-time resources).

Eighth Preferred Embodiment

An eighth preferred embodiment of the present invention provides a method for allowing the reception end to effectively receive signals on the condition that the transmission end transmits the pilot signal equipped with the auxiliary signal (aux). If the reception end does not recognize information of the auxiliary signal, the auxiliary signal may act as the interference signal. Therefore, preferably, if the auxiliary signal is additionally transmitted, the reception end may remove the above-mentioned auxiliary signal.

Figure 21:
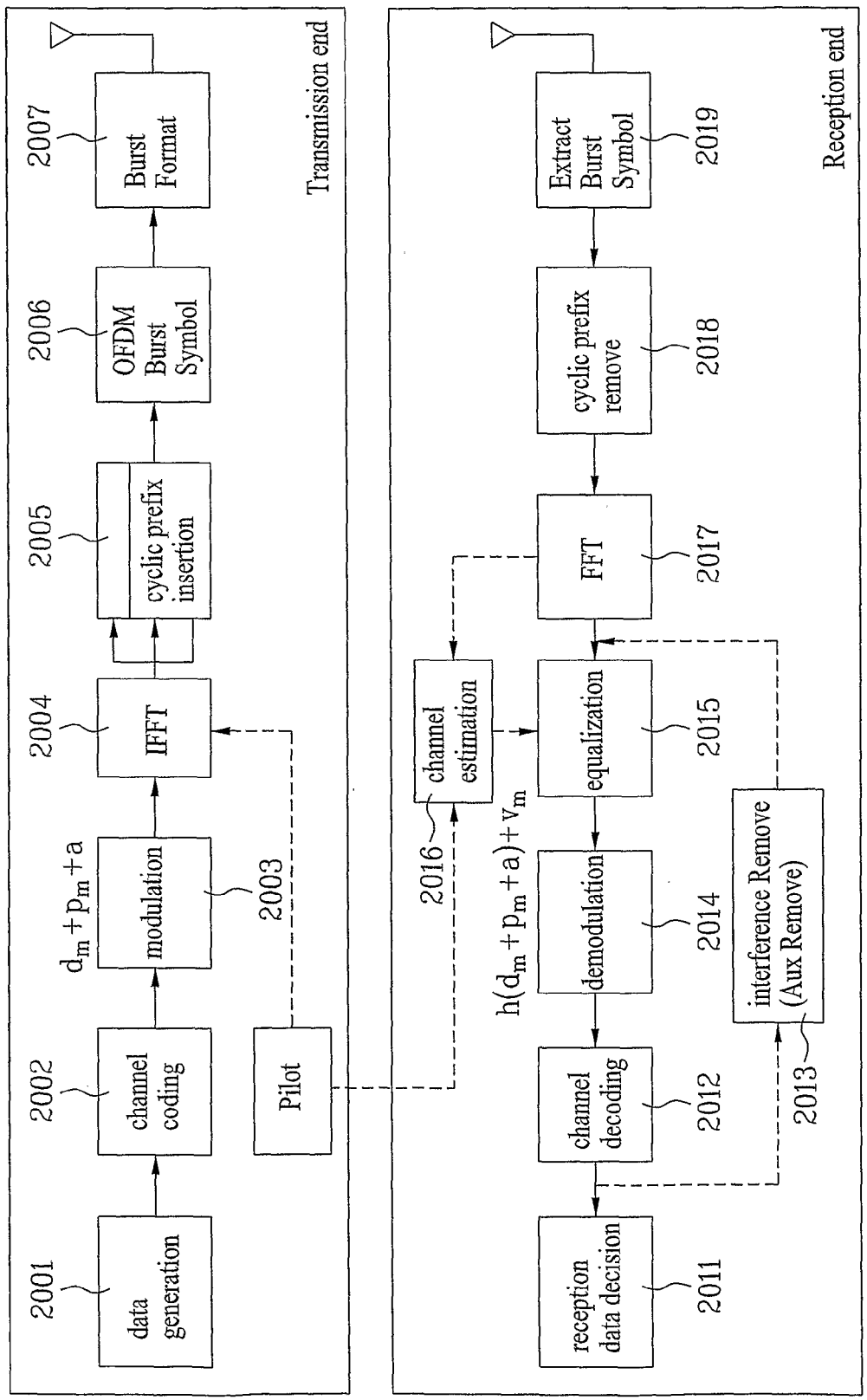
FIG. 21 is a block diagram illustrating a reception end for removing an auxiliary signal according to an eighth preferred embodiment of the present invention.

FIG. 21 is a block diagram illustrating a reception end for removing an auxiliary signal according to an eighth preferred embodiment of the present invention.

Referring to FIG. 21, if data is created at step 2001, the transmission end performs the channel coding for the created data at step 2002.

The modulation is executed in association with the channel-coding result at step 2003. In this case, data ($d_m$), the auxiliary signal (a), and the pilot signal ($p_m$) are contained in each sample, such that the resultant sample is transmitted at step 2003.

The above-mentioned modulation result is transmitted by an IFFT module 2004 via a plurality of subcarriers. In this case, a cyclic prefix is inserted in the above-mentioned modulation result by a cyclic prefix insertion module 2005, such that the modulation result including the cyclic prefix is transmitted. In other words, the above-mentioned modulation result is configured in the form of an OFDM burst symbol according to a communication protocol, such that it is transmitted to the reception end at steps 2006 and 2007.

The reception end receives the OFDM symbol according to the communication protocol, removes the cyclic prefix from the received OFDM symbol, and executes an FFT calculation at steps 2017, 2018, and 2019. The pilot value can be recognized by the FFT calculation, such that the channel estimation unit 2016 performs the channel estimation, and the equalization 2015 is executed by the estimated channel value.

The equalized result value is demodulated by the demodulation unit 2014, the channel decoding 2012 is executed on the demodulated result, and the channel-decoded result is applied to the interference remover 2013 according to the eighth preferred embodiment of the present invention. The interference remover 2013 calculates the value of the auxiliary signals used for the transmission end, such that it removes the value of the auxiliary signals.

The above-mentioned method for calculating/removing the auxiliary-signal value will hereinafter be described in detail.

The interference remover 2013 can calculate the auxiliary signal using the data ($d_m$) contained in each sample.

The input signal of the interference remover 2013 is indicative of a channel-estimated signal under the condition that the above-mentioned auxiliary is not removed, such that the input signal may also have the estimated value. Therefore, the data received in the interference remover 2013 is denoted by $d_m$.

As previously stated in Equation 2b, the transmission end calculates the auxiliary signal using the following equation denoted by $$\sum_{m=0}^{N-1}(d_m + a) = 0 \Leftrightarrow a = \frac{-\sum_{m=0}^{N-1} d_m}{N}.$$

Therefore, the interference remover 2013 estimates the auxiliary signal "a" using the following equation denoted by $$-\frac{\sum_{m=0}^{N-1} d'_m}{N} = a'.$$

In brief, the above-mentioned interference remover 2013 can estimate the auxiliary signal (a') using data ($d_m'$) to which the removal of interference is not applied.

If the reception end recognizes the estimated auxiliary signal a', the auxiliary signal is removed, such that the equalization can be correctly executed. Provided that the reception signal is denoted by $x_m$, the reception signal $x_m$ from which the auxiliary signal is not removed can be represented by the following Equation 7a:

$$x_m = h(d_m + p_m + a) + c_m \quad \text{[Equation 7a]}$$

The interference remover 2013 can estimate the auxiliary signal. In more detail, provided that the channel value estimated by the channel estimator 2016 is denoted by h', the interference can be removed as represented by the following Equation 7b:

$$x_m = h(d_m + p_m + a) + c_m - h' \cdot a' \simeq h(d_m + p_m) + v_m \quad \text{[Equation 7b]}$$

Although the value of h' may be different from the channel value of h, the value h' is very close to the value of h, such that the negative influence caused by the auxiliary signal (a) may be minimized if the operation of Equation 7b is executed.

The interference remover 2013 executes the operation of Equation 7b to remove the auxiliary signal. Therefore, the reception end can demodulate the signal having no auxiliary signal.

Ninth Preferred Embodiment

A ninth preferred embodiment of the present invention provides a method for minimizing the amplitude of the auxiliary signal if the transmission end transmits the pilot signal equipped with the auxiliary signal (aux).

In the case of transmitting data using the modulation scheme, the data is transmitted using a high-density transmission scheme (e.g., 16QAM or 64QAM scheme), the probability of increasing the amplitude of the auxiliary signal is relatively increased. In this case, performance deterioration may occur in the reception end due to the auxiliary signal.

Although the interference remover for removing the auxiliary signal is used as shown in the above-mentioned eighth preferred embodiment, the interference remover has difficulty in correctly removing the auxiliary signal due to the occurrence of a high-value auxiliary signal. Therefore, preferably, the auxiliary signal may be minimized in the case of employing the high-density transmission scheme of the 16QAM or more.

In order to minimize the amplitude of the above-mentioned auxiliary signal, the two-stage coding method may be executed. Also, the above-mentioned coding may be a coding method based on orthogonal codes.

The above-mentioned two-stage coding method selects orthogonal codes for minimizing the amplitude of the auxiliary signal, executes a first-stage coding on the selected orthogonal codes, and then executes a second-stage coding process for informing the reception end of the selected orthogonal codes.

Figure 22:
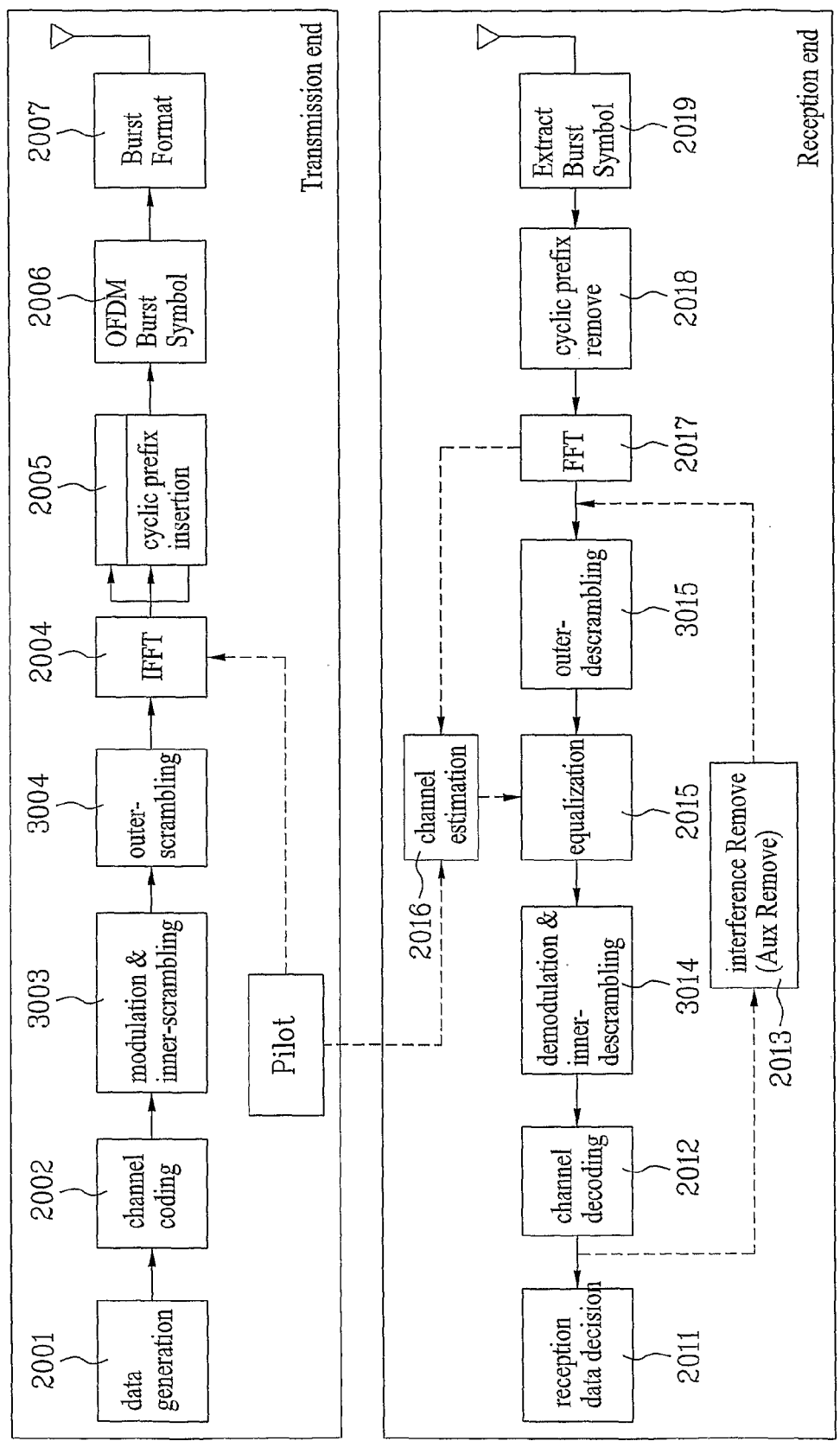
FIG. 22 is a block diagram illustrating transmission and reception ends for the coding operation capable of reducing the size of an auxiliary signal according to the present invention.

FIG. 22 is a block diagram illustrating transmission and reception ends for the coding operation capable of reducing the size of an auxiliary signal according to the present invention. The transmission and reception ends of FIG. 22 have the same operations as the transmission end of FIG. 21, but they execute two-stage coding/decoding processes differently from the transmission end of FIG. 21.

Firstly, the coding method for use in the transmission end will hereinafter be described. The transmission end according to the ninth preferred embodiment performs the two-stage coding process using the orthogonal codes shown in the following Table 1:

TABLE 1

| Hadamard code, Length = 24 | | | | | | | | | | | | | | | | | | | | | | | | |
|---|---|---|---|---|---|---|---|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | -1 | 1 | -1 | 1 | 1 | 1 | -1 | -1 | -1 | 1 | -1 | 1 | -1 | 1 | -1 | 1 | 1 | 1 | -1 | -1 | -1 | 1 | -1 |
| 2 | 1 | -1 | -1 | 1 | -1 | 1 | 1 | 1 | -1 | -1 | -1 | 1 | 1 | -1 | -1 | 1 | -1 | 1 | 1 | 1 | -1 | -1 | -1 | 1 |
| 3 | 1 | 1 | -1 | -1 | 1 | -1 | 1 | 1 | 1 | -1 | -1 | -1 | 1 | 1 | -1 | -1 | 1 | -1 | 1 | 1 | 1 | -1 | -1 | -1 |
| 4 | 1 | -1 | 1 | -1 | -1 | 1 | -1 | 1 | 1 | 1 | -1 | 1 | -1 | 1 | -1 | -1 | 1 | -1 | 1 | 1 | 1 | -1 | 1 | -1 |
| 5 | 1 | -1 | -1 | 1 | -1 | -1 | 1 | -1 | 1 | 1 | 1 | -1 | 1 | -1 | -1 | 1 | -1 | -1 | 1 | -1 | 1 | 1 | 1 | -1 |
| 6 | 1 | -1 | -1 | -1 | 1 | -1 | -1 | 1 | -1 | 1 | 1 | 1 | -1 | -1 | -1 | 1 | -1 | -1 | 1 | -1 | 1 | -1 | 1 | 1 |
| 7 | 1 | 1 | -1 | -1 | -1 | 1 | -1 | -1 | 1 | -1 | 1 | 1 | 1 | -1 | -1 | -1 | 1 | -1 | -1 | 1 | -1 | 1 | 1 | 1 |
| 8 | 1 | 1 | 1 | -1 | -1 | -1 | 1 | -1 | -1 | 1 | -1 | 1 | 1 | 1 | -1 | -1 | -1 | 1 | -1 | -1 | 1 | -1 | 1 | 1 |

The above-mentioned Table 1 is the Hadamard code having the length of 24. According to the above-mentioned ninth preferred embodiment, the coding process is executed by orthogonal codes.

However, it should be noted that there is no limitation in categories of the above-mentioned orthogonal codes. For example, a CAZAC (constant-amplitude, zero autocorrelation) sequence or other sequences based on specific-row or column-components of the FFT matrix may be used for the above-mentioned coding process.

Firstly, a first-stage coding process (for the convenience of description, hereinafter referred to as an inner scramble or scrambling) will hereinafter be described. The orthogonal code of Table 1 has the length of 24, such that it may be multiplied by 24 samples shown in the above-mentioned Table 1.

TABLE 2

| |
|---|
| $d_0 + a$ |
| $d_1 + a$ |
| $d_2 + a$ |
| $d_3 + a$ |
| $d_4 + a$ |
| $d_5 + a$ |
| $d_6 + a$ |
| $d_7 + a$ |
| $D_8 + a$ |
| $D_9 + a$ |
| $d_{10} + a$ |
| $d_{11} + a$ |
| $d_{12} + a$ |
| $d_{13} + a$ |
| $d_{14} + a$ |

TABLE 2-continued $d_{15} + a$
$d_{16} + a$
$d_{17} + a$
$d_{18} + a$
$d_{19} + a$
$d_{20} + a$
$d_{21} + a$
$d_{22} + a$
$d_{23} + a$ The samples of the above-mentioned Table 2 perform the inner scrambling using the Hadamard code of Table 1.

The Hadamard code of Table 1 is composed of 9 codes (i.e., 0-th to 8-th codes), such that an example of the 0-th to 2nd codes from among the 9 codes will be described.

The 0-th code, the first code, and the second code are sequentially multiplied by 24 samples (i.e., $d_0 \sim d_{23}$).

The lowest value from among the resultant values inner-scrambled by the 0-th code, the first code, and the second code is selected. In more detail, the lowest value from among the values of the auxiliary signals "a", which are acquired by the sum of the multiplied values equal to the multiplied values of the 24 samples and each of the 0th code, the first code, and the second code, is selected. In other words, a specific code for minimizing the sum of the sample signals from among the above-mentioned 0-th to second codes is selected.

The above-mentioned sample is configured in the form of a complex number, such that the amplitude of each sample is determined by the amplitude of a real part of the complex number and the amplitude of an imaginary part of the complex number. In other words, the orthogonal code for minimizing the amplitude of the real part of each of the 24 samples is selected, and the other orthogonal code for minimizing the amplitude of the imaginary part of each of the 24 samples is selected.

In conclusion, two orthogonal codes for minimizing the amplitude of specific samples are selected. Also, the second-stage coding process is executed by the above-mentioned two orthogonal codes. In other words, the outer-scrambling is performed by the above-mentioned inner-scrambling codes.

The above-mentioned outer-scrambling is also executed by the orthogonal codes shown in Table 1. The reception end recognizes outer-scrambling codes, such that the above-mentioned inner-scrambling code can be distinguished from each other.

The relationship between the inner-scrambling codes (i.e., inner codes) and the outer-scrambling codes (i.e., outer codes) can be represented by the following Table 3:

TABLE 3

| Inner codes applied to real part | Inner codes applied to imaginary part | Outer codes defined by inner codes |
|---|---|---|
| 0 | 0 | 0 |
| 0 | 1 | 1 |
| 0 | 2 | 2 |
| 1 | 0 | 3 |
| 1 | 1 | 4 |
| 1 | 2 | 5 |
| 2 | 0 | 6 |
| 2 | 1 | 7 |
| 2 | 2 | 8 |

For example, provided that a code for minimizing the value of the real part of each of the 24 samples is the first code, and a code for minimizing the value of the imaginary part of each of the 24 samples is the second code, the above-mentioned outer codes are determined by the fifth code shown in Table 1.

The above-mentioned outer scrambling is executed by the above-mentioned outer codes, such that the above-mentioned fifth code is multiplied by the 24 samples to which the inner scrambling has been executed.

In brief, the transmission end according to the above-mentioned preferred embodiment of the present invention performs the two-stage coding process. The first-stage coding is executed by the inner scrambling, and the second-stage coding is executed by the outer scrambling.

The above-mentioned inner scrambling selects two inner codes capable of minimizing a predetermined number of samples, and applies the two selected inner codes to the predetermined number of scrambles, resulting in the implementation of the inner scrambling.

The above-mentioned outer scrambling selects a specific outer code indicating the above-mentioned two inner codes, and applies the two selected outer codes to the predetermined number of samples, resulting in the implementation of the outer scrambling.

If the method for performing the above-mentioned two-stage coding process is expressed by a specific algorithm based on computer programming languages, the result is as shown in FIG. 23.

FIG. 23 is a flow chart illustrating a method for executing a specific coding composed of two stages according to the present invention.

Referring to FIG. 23, the initialization process is executed at steps S2301 and S2302. In FIG. 23, "index" is a variable indicating the inner codes.

The value of "index" is compared with a specific value "# of Hadamard code" at step S2303. In this case, the value of "# of Hadamard code" indicates the number of inner codes to be multiplied.

The 0-th to second codes of Table 1 are used for the above-mentioned example. The value of "# of Hadamard code" is to be "3". The variable initialization is executed by the operation of S2304. The value of "data_index" is a variable for indicating the number of samples.

The value of "data_index" is compared with the other value "# of data_index" at step S2305. In this case, the value of "# of data_index" indicates the number of samples to which the inner or outer codes are applied.

Step S2306 indicates the inner-scrambling process, such that a specific orthogonal code is multiplied by each data sample. The variable value is adjusted for the multiplications corresponding to a desired number of times at steps S2307 and S2308.

If the multiplication is executed a predetermined number of times corresponding to the value "# of Hadamard code", two inner codes for minimizing the sample value are defined at step 2309, and the outer codes are selected according to Table 3.

If the above-mentioned outer codes are selected, they are applied to all the samples at step S2310. The above-mentioned inner scrambling may be executed by the inner scrambling module 3003 of FIG. 22, and the above-mentioned outer scrambling may be executed by the outer scrambling module 3004 of FIG. 22.

Operations of the reception end are as follows.

The reception end includes information denoted by Table 1 and other information denoted by Table 3, such that it can recognize the outer codes using the above-mentioned Table 1.

In other words, the reception end can recognize the outer codes using correlation values between the orthogonal code of Table 1 and the reception signal. If the outer code is defined, the reception end can recognize which one of inner codes has been used by referring to Table 3. By the above-mentioned operations, the reception end can recover samples acquired before receiving the inner codes.

The operations of the above-mentioned reception end can be mathematically represented by the following Equation 8a:

$$x_m = h\{C_{outer,m}(d'_m + p_m + a')\} + v_m \quad \text{[Equation 8a]}$$

Equation 8a shows reception signals received in the reception end. As denoted by Equation 8a, $d_m$ and "a" contained in the sample have different data values according to the inner scrambling of the transmission end. $d_m'$ and a' are an inner-scrambled data-symbol value and an inner-scrambled auxiliary-signal value, respectively. In this case, the inner scrambling of the value $d_m'$ or a' is performed by the above-mentioned inner codes.

In more detail, the value of a' has specific characteristics denoted by $$a' = -\frac{\sum_{m=0}^{N-1} d'_m}{N}.$$

In Equation 8a, $v_m$ is AWGN, $C_{outer,m}$ is the outer codes associated with an m-th sample, and h is a channel value. In more detail, the reception end receives the signal to which the inner and outer codes are applied.

$$\sum_{m=0}^{N-1} C_{outer,m} \cdot x_m = \quad \text{[Equation 8b]}$$

$$\sum_{m=0}^{N-1} C_{outer,m} \cdot h\{C_{outer,m}(d'_m + p_m + a')\} + v_m =$$

$$\sum_{m=0}^{N-1} h(d'_m + p_m + a') + \hat{v}_m \simeq N \cdot h \cdot p,$$

$$\therefore \sum_{m=0}^{N-1} h(d'_m + a') + \hat{v}_m \simeq 0$$

As described above, an outer descrambling module 3015 of the reception end detects the value "$C_{outer,m}$" using the correlation value between the orthogonal code of Table 1 and the reception signal. If a correct outer code is determined, the value N·h·p is received as denoted by Equation 8b.

$$\sum_{m=0}^{N-1} C_{outer(wrong),m} \cdot x_m = \quad \text{[Equation 8c]}$$

$$\sum_{m=0}^{N-1} C_{outer(wrong),m} \cdot h\{C_{outer,m}(d'_m + p_m + a')\} + v_m =$$

$$\sum_{m=0}^{N-1} C_{outer(wrong),m} \cdot C_{outer,m} \cdot h(d'_m + a') + \hat{v}_m =$$

$$\sum_{m=0}^{N-1} C_{outer(wrong),m} \cdot C_{outer,m} \cdot h(d'_m + a'),$$

$$\therefore \sum_{m=0}^{N-1} h \cdot P_m + \hat{v}_m \simeq 0$$

If an incorrect outer code is determined, $$\sum_{m=0}^{N-1} C_{outer(wrong),m} \cdot C_{outer,m} \cdot h(d'_m + a')$$

is received as denoted by the Equation 8c.

$$\text{Power}(N \cdot h \cdot p) > \quad \text{[Equation 8d]}$$

$$\text{Power}\left(\sum_{m=0}^{N-1} C_{outer,(wrong)m} \cdot C_{outer,m} \cdot h(d'_m + a')\right)$$

As can be seen from Equation 8d, the power value N·h·p is higher than the value $$\sum_{m=0}^{N-1} C_{outer(wrong),m} \cdot C_{outer,m} \cdot h(d'_m + a'),$$

such that the reception end can detect the correct outer codes.

If the above-mentioned outer codes are correctly detected, the reception end can recognize information of the inner codes by referring to Table 3. If the above-mentioned inner codes are recognized, the inner descrambling module 3014 of the reception end recovers original data acquired prior to the inner scrambling.

The orthogonal codes of Table 1 may be configured to have a variety of lengths. The number of the orthogonal codes may be freely set to any number.

Also, the combination of the inner codes and the outer codes in Table 3 can be implemented in various ways. The above-mentioned Tables 1, 2, and 3 have been disclosed for only the illustrative purposes, so that the scope of the present invention is not limited to the exemplary numbers depicted in the above-mentioned Tables or Equations, and can be applied to other examples as necessary.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

INDUSTRIAL APPLICABILITY

A method for transmitting/receiving a signal equipped with a disjointed pilot signal in a mobile communication system according to the present invention can reduce an amount of frequency-time resources used for a training symbol (i.e., a pilot signal), such that it can effectively use radio resources.

What is claimed is:

1. A method for transmitting signals having training symbols in a mobile communication system, the method comprising:
configuring output signals by adding training symbols to all data symbols;
adding auxiliary signals to the output signals; and
transmitting the output signals to a receiving end,
wherein the auxiliary signals are calculated to make a sum of the data symbols and the auxiliary signals zero.

2. The method of claim 1, wherein the training symbols have the same amplitude and the auxiliary signals have the same amplitude.

3. The method of claim 1, wherein the output signals are transmitted via a plurality of subcarriers.

4. The method of claim 1, wherein configuring the output signals comprises:
coding the data symbols using a modulo function, a predetermined coding value, and differences between values of the data symbols and values of predetermined auxiliary signals, wherein amplitudes of the coded data symbols are decreased.

5. A method for transmitting signals having training symbols in a mobile communication system, the method comprising:
configuring output signals by adding training symbols and auxiliary signals to all data symbols, wherein the auxiliary signals are calculated to make a sum of the data symbols and the auxiliary signals zero;
transmitting the output signals to a receiving end;
performing an inner scrambling of the output signals according to a first code of a plurality of orthogonal codes; and
performing an outer scrambling of the inner scrambled signals according to a second code of the plurality of orthogonal codes,
wherein the plurality of orthogonal codes are Hadamard codes, and
the second code is determined by the first code.

6. The method of claim 5, wherein performing the inner scrambling comprises:
selecting a first scrambling code of the orthogonal codes to minimize an amplitude of a real part of the output signals;
selecting a second scrambling code of the orthogonal codes to minimize an amplitude of an imaginary part of the output signals; and
multiplying the first and the second scrambling codes by the real part and the imaginary part of the output signals.

7. The method of claim 5, wherein the stop of performing the outer scrambling comprises:
multiplying the second code by the inner scrambled signals.

8. An apparatus for transmitting signals having training symbols in a mobile communication system, the apparatus comprising:
a signal processing module for configuring output signals by adding training symbols and auxiliary signals to all data symbols, wherein the auxiliary signals are calculated to make a sum of the data symbols and the auxiliary signals zero; and
a radio frequency module for transmitting the configured output signals.

9. The apparatus of claim 8, further comprising:
a data scrambler for performing an inner scrambling of the output signals and an outer scrambling of the inner scrambled signals according to orthogonal codes.

10. A method for receiving signals having training symbols in a mobile communication system, the method comprising:
receiving the signals having the training symbols, auxiliary signals and data symbols, wherein a sum of the data symbols and the auxiliary signals is zero;
performing a channel estimation of the received signals using training symbols included in all of the data symbols;
decoding the channel estimated signals;
estimating the auxiliary signals using the decoded signals; and
removing the estimated auxiliary signals from the received signals.

11. The method of claim 10, further comprising:
performing an outer descrambling of the received signals according to a first code a plurality of orthogonal codes; and
performing an inner descrambling of the outer descrambled signals according to a second code of the plurality of orthogonal codes,
wherein the orthogonal codes are Hadamard codes, and
wherein the second code is indicated by the first code.

12. The method of claim 11, wherein outer descrambling of the received signals comprises:
detecting a first descrambling code using the received signals and the plurality of orthogonal codes; and
acquiring descrambled signals by multiplying the first descrambling code by the received signals.

13. An apparatus for receiving signals in a mobile communication system, the apparatus comprising:
a radio frequency module for receiving signals having training symbols, auxiliary signals and data symbols, wherein a sum of the data symbol and the auxiliary signals is zero;
a channel estimator for performing a channel estimation of the received signals using training symbols included in all of the data symbols; and
a decoder for decoding the channel estimated signals.

14. The apparatus of claim 13, further comprising:
a estimator for estimating the auxiliary signals using the decoded signals; and
a module for removing the estimated auxiliary signals from the received signals.

* * * * *